(12) United States Patent
Nam et al.

(10) Patent No.: US 10,603,786 B2
(45) Date of Patent: Mar. 31, 2020

(54) BELT FOR EFFECTIVE WEARING AND WEARABLE ASSISTIVE DEVICE HAVING THE SAME

(71) Applicant: LG ELECTRONICS INC., Seoul (KR)

(72) Inventors: Bohyun Nam, Seoul (KR); Kyu Tae Park, Seoul (KR); Jung Kyu Son, Seoul (KR); Seonil Yu, Seoul (KR); Wonjun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/352,940

(22) Filed: Mar. 14, 2019

(65) Prior Publication Data

US 2019/0283236 A1    Sep. 19, 2019

Related U.S. Application Data

(60) Provisional application No. 62/730,399, filed on Sep. 12, 2018, provisional application No. 62/730,400, (Continued)

(30) Foreign Application Priority Data

Mar. 16, 2018 (KR) ......................... 10-2018-0030948
Jul. 24, 2018 (KR) ......................... 10-2018-0085790

(51) Int. Cl.
*A61H 3/00* (2006.01)
*B25J 9/00* (2006.01)
*A61H 1/02* (2006.01)

(52) U.S. Cl.
CPC ............ *B25J 9/0006* (2013.01); *A61H 1/024* (2013.01); *A61H 1/0237* (2013.01);
(Continued)

(58) Field of Classification Search
CPC ............... A61H 3/008; A61H 2205/10; A61H 2003/007; B06R 22/34; B06R 22/3413; B06R 22/357
See application file for complete search history.

(56) References Cited

U.S. PATENT DOCUMENTS 406,328 A     7/1889  Yagn
5,439,253 A *  8/1995  Trubiano ............. A47D 15/006
                                                280/33.993
(Continued)

FOREIGN PATENT DOCUMENTS

CN    103610524    3/2014
CN    103610568    3/2014
(Continued)

OTHER PUBLICATIONS

U.S. Appl. No. 16/274,560, filed Feb. 13, 2019.
(Continued)

*Primary Examiner* — Dinah Baria
(74) *Attorney, Agent, or Firm* — Ked & Associates LLP

(57) ABSTRACT

A wearable assistive device may include a main frame provided on a user's waist, a leg assembly that extends from an end of the main frame, and an optional foot support installed at an end of the leg assembly to support the user's foot. The leg assembly may include a leg frame having a first end connected to the main frame and a second end connected to the foot support, and a leg belt mounted on the leg frame. The leg belt may include a belt to secure a leg of the user and a wire winding structure that may include a wire connected to a first end of the belt and a wire winding dispenser on which the wire is wound and which fixes or releases a second end of the belt.

19 Claims, 26 Drawing Sheets

Related U.S. Application Data filed on Sep. 12, 2018, provisional application No. 62/730,412, filed on Sep. 12, 2018, provisional application No. 62/730,420, filed on Sep. 12, 2018.

(52) U.S. Cl.
CPC ......... *A61H 1/0244* (2013.01); *A61H 1/0262* (2013.01); *A61H 3/00* (2013.01); *A61H 3/008* (2013.01); *A61H 2003/007* (2013.01); *A61H 2201/0107* (2013.01); *A61H 2201/0192* (2013.01); *A61H 2201/1207* (2013.01); *A61H 2201/1238* (2013.01); *A61H 2201/163* (2013.01); *A61H 2201/165* (2013.01); *A61H 2201/1642* (2013.01); *A61H 2203/0406* (2013.01); *A61H 2205/10* (2013.01)

(56) References Cited

U.S. PATENT DOCUMENTS

| | | |
|---|---|---|
| 6,694,643 B1 | 2/2004 | Hsu |
| 9,314,393 B2 | 4/2016 | Kim et al. |
| 9,849,048 B2 | 12/2017 | Borisoff et al. |
| 9,956,107 B2 | 5/2018 | Blanck |
| 2006/0020237 A1 | 1/2006 | Nordt, III et al. |
| 2006/0064047 A1 | 3/2006 | Shimada et al. |
| 2006/0258967 A1 | 11/2006 | Fujil et al. |
| 2010/0121232 A1 | 5/2010 | Sankai |
| 2011/0172570 A1 | 7/2011 | Shimizu et al. |
| 2012/0271207 A1 | 10/2012 | Schoen et al. |
| 2015/0038889 A1 | 2/2015 | Mason et al. |
| 2015/0051638 A1 | 2/2015 | Dickinson et al. |
| 2015/0134080 A1 | 5/2015 | Roh |
| 2015/0182366 A1 | 7/2015 | Takenaka et al. |
| 2015/0209215 A1 | 7/2015 | Lee et al. |
| 2015/0272810 A1 | 10/2015 | Teng et al. |
| 2015/0283009 A1 | 10/2015 | Borisoff et al. |
| 2015/0335515 A1 | 11/2015 | Lee et al. |
| 2016/0045382 A1 | 2/2016 | Goffer |
| 2016/0331624 A1 | 11/2016 | Sankai et al. |
| 2017/0049659 A1 | 2/2017 | Farris et al. |
| 2017/0065441 A1 | 3/2017 | Lee et al. |
| 2017/0165087 A1 | 6/2017 | Kim et al. |
| 2018/0200134 A1 | 7/2018 | Tsai et al. |
| 2019/0015273 A1 | 1/2019 | Linon |

FOREIGN PATENT DOCUMENTS

| | | |
|---|---|---|
| CN | 105662780 | 6/2016 |
| CN | 106420270 | 2/2017 |
| CN | 107595555 | 1/2018 |
| CN | 108524199 | 9/2018 |
| EP | 3 103 426 | 12/2016 |
| EP | 3 181 110 | 6/2017 |
| EP | 3 207 909 | 8/2017 |
| JP | H 07-116207 | 5/1995 |
| JP | 2005-000634 | 1/2005 |
| JP | 2006-087533 | 4/2006 |
| JP | 2007-089633 | 4/2007 |
| JP | 2011-045657 | 3/2011 |
| JP | 2011-139869 | 7/2011 |
| JP | 2013-070784 | 4/2013 |
| JP | 2015-136623 | 7/2015 |
| JP | 2015-139665 | 8/2015 |
| JP | 2015-188740 | 11/2015 |
| JP | 2015-221139 | 12/2015 |
| JP | 5878583 | 3/2016 |
| JP | 2016-209443 | 12/2016 |
| KR | 20-1999-0027436 | 7/1999 |
| KR | 10-0716597 | 5/2007 |
| KR | 10-1052692 | 7/2011 |
| KR | 10-1070973 | 10/2011 |
| KR | 10-2011-0124924 | 11/2011 |
| KR | 10-1146112 | 5/2012 |
| KR | 10-2012-0104742 | 9/2012 |
| KR | 10-1196104 | 11/2012 |
| KR | 10-1219795 | 1/2013 |
| KR | 10-2013-0045777 | 5/2013 |
| KR | 20-0470552 | 12/2013 |
| KR | 10-1363834 | 2/2014 |
| KR | 10-1363850 | 2/2014 |
| KR | 10-1417895 | 7/2014 |
| KR | 10-1433284 | 9/2014 |
| KR | 10-2014-0121371 | 10/2014 |
| KR | 10-1536586 | 7/2015 |
| KR | 10-1600600 | 3/2016 |
| KR | 10-2016-0091025 | 8/2016 |
| KR | 10-1650101 | 8/2016 |
| KR | 10-1735214 | 5/2017 |
| KR | 10-1737885 | 5/2017 |
| KR | 10-2017-0111279 | 10/2017 |
| KR | 10-1787555 | 10/2017 |
| KR | 10-1787557 | 10/2017 |
| KR | 10-1788567 | 11/2017 |
| WO | WO 2012/125765 | 9/2012 |

OTHER PUBLICATIONS

U.S. Appl. No. 16/274,584, filed Feb. 13, 2019.
U.S. Appl. No. 16/274,613, filed Feb. 13, 2019.
U.S. Appl. No. 16/282,458, filed Feb. 22, 2019.
U.S. Appl. No. 16/274,662, filed Feb. 13, 2019.
U.S. Appl. No. 16/274,697, filed Feb. 13, 2019.
U.S. Appl. No. 16/282,409, filed Feb. 22, 2019.
U.S. Appl. No. 16/352,920, filed Mar. 14, 2019.
U.S. Appl. No. 16/274,798, filed Feb. 13, 2019.
U.S. Appl. No. 16/353,843, filed Mar. 14, 2019.
U.S. Appl. No. 16/583,744, filed Sep. 26, 2019.
International Search Report dated Jul. 4, 2019 issued in Application No. PCT/KR2019/003071.
International Search Report dated Jul. 12, 2019 issued in Application No. PCT/KR2019/003070.
European Search Report dated Aug. 13, 2019 issued in Application No. 19163259.5.
European Search Report dated Aug. 13, 2019 issued in Application No. 19163268.6.
European Search Report dated Aug. 27, 2019 issued in Application No. 19158443.2.
International Search Report dated May 9, 2019 issued in Application No. PCT/KR2019/001079.
International Search Report dated May 16, 2019 issued in Application No. PCT/KR2019/001086.
International Search Report dated May 16, 2019 issued in Application No. PCT/KR2019/001088.
European Search Report dated May 27, 2019 issued in Application No. 19158443.2.
European Search Report dated Jun. 11, 2019 issued in Application No. 19159508.1.
European Search Report dated Jun. 11, 2019 issued in Application No. 19159516.4.
International Search Report dated Jun. 11, 2019 issued in Application No. PCT/KR2019/002175.
International Search Report dated Jun. 12, 2019 issued in Application No. PCT/KR2019/002239.
European Search Report dated Aug. 13, 2019 issued in Application No. 19158779.9.
European Search Report dated Aug. 13, 2019 issued in Application No. 19158657.7.
Article from https://social.lge.co.kr/newsroom/lg_cloisuitbot_1227/, dated Dec. 27, 2018, entitled, "ArtCLOi Suitbot Unveiled Wearable Robot That Increases Waist Strength."
International Search Report dated Sep. 26, 2019 issued in Application No. PCT/KR2019/000059.

* cited by examiner

BELT FOR EFFECTIVE WEARING AND WEARABLE ASSISTIVE DEVICE HAVING THE SAME

CROSS-REFERENCE TO RELATED APPLICATION(S)

This application claims priority under 35 U.S.C. to § 119 to U.S. Provisional Patent Application Nos. 62/730,399, 62/730,400, 62/730,412, and 62/730,420, all filed on Sep. 12, 2018, and also to Korean Application No. 10-2018-0030948, filed on Mar. 16, 2018, and Korean Application No. 10-2018-0085790, filed on Jul. 24, 2018, whose entire disclosure is hereby incorporated by reference.

BACKGROUND

1. Field

This application relates to assistive and/or rehabilitative technology.

2. Background

In assistive and/or rehabilitative technology, a wearable assistive device such as a wearable robot or robotic exoskeleton may assist or augment a movement of a user by providing an assistive force at various joints. The assistive force may be generated from a driving apparatus such as a motor.

The wearable assistive device may be worn on and secured toe waist, a leg, and/or foot of the user. A detachment mechanism that secures the assistive device to the user is an important factor that determines the efficiency and convenience of use.

A conventional "wearable action-assisting device" is disclosed in US Patent Application No. 2016-0331624. The wearable action-assisting device according to the related art will be described with reference to the above.

FIG. 1 is a configuration view of the wearable action-assisting device. The wearable action-assisting device 10' may include a waist frame 11', a lower frame or leg frame 12' and a control portion or back frame 18'. The lower frame 12' and the back frame 18' may be coupled to the waist frame 11'. The lower frame 12' may be mounted with a thigh cuff or thigh support 100'. The thigh support 100' may be coupled with a belt 81' to secure the leg.

FIG. 2 is a configuration view of a thigh support in the wearable action-assisting device shown in FIG. 1. The thigh support 100' may include a fixing member or first support 110', a bracket member or bracket 132', and a cuff supporting member or second support 130'. The bracket 132' may be coupled to the first support 110'. An arc type guide hole or guide slot 135' may be formed in the bracket 132'. The second support 130' may be coupled to the guide slot 135'. The second support 130' may be moved along the guide slot 135'. The second support 130' may be coupled to the first support 110' and may move in the direction of the arrow in FIG. 2 to adjust a width of a side of the thigh support 100'.

Connecting portions or belt loops 114' and 137' may be formed on the first and second supports 110' and 130', respectively. Ends of the belt (81' in FIG. 1) may be connected to the belt loops 114' and 137'. However, the thigh support 100' may not include a belt storage area capable of storing the belt. Further, when the thigh support 100' is not used, the belt 81' may be continuous exposed to an outside, increasing a probability of contamination and damage 81'.

Further, as the belt 81' in the wearable action-assisting device 10' according to the related art may have to be stored separately, a user may lose the belt 81'. In addition, since the user may have to couple the belt 81' to the belt loops 137' and 114' each time to use the wearable action-assisting device 10', securing the belt 81' and using the wearable action-assisting device may become cumbersome and inefficient, making preparing to use the wearable action-assisting device 10' a slow process.

A shoelace fastening device is disclosed in KR Patent No. 10-1737885 (FIGS. 3 and 4) and a shoelace adjustment mechanism is disclosed in U.S. Pat. No. 6,694,643 (FIGS. 5 and 6). FIG. 3 is a schematic configuration view of a shoe string dial method according to related art. FIG. 4 is a cross-sectional view of the shoe string dial method shown in FIG. 3.

A shoe string dial apparatus may include a string fastening means or dial fastener 20" and a lock operating means or lock 30". The dial fastener 20" may include a dial 21." The dial 21" may include a winding portion or winder $21c"$ and a ratchet type gear or gear 31". A shoe string may be wound in the winder $21c"$ under the gear 31".

The lock 30" may include the gear 31", a lock button or stopper 35", and a torsion spring 37". The gear 31" may have teeth formed on a circumference of the dial 21". The torsion spring 37" may elastically support the stopper 35".

In order to fasten the shoe string, a user rotates the dial 21" in a first direction to wind the shoe string in the dial winding portion $21c"$. A rotation of the dial 21" in a reverse or second direction opposite the first direction may be limited by the gear 31" and the stopper 35", preventing the shoe string from becoming accidentally untied or unwound.

To untie or loosen the shoe string, the user may rotate the stopper 35". Accordingly, the stopper 35" may be taken off the gear 31". In this state, the user may rotate the dial 21" in the second direction. The shoe string that is wound in the winder $21c$ may be untied.

The stopper 35" may be separately provided at aside of the dial 21", increasing the size of the shoe fastening device. In addition, since the user operates the dial 21" while also operating the stopper 35", untying the shoe string may be very cumbersome.

FIG. 5 is a configuration view schematically showing a shoelace adjustment mechanism according to the related art. A shoelace adjustment mechanism may include a push button or button 3", a coupling element or housing 5", a reel 6", and a lower base 7". Through the lower base 7", a shoe string 15" may be coupled to the reel 6".

When the length of the shoe string 15" is adjusted, a user may push the button 3" through a plate or washer 4" to connect the housing 5" and the reel 6". The user may rotate the button 3," and the reel 6" may be interlocked with the button 3". Further, when the user pushes the button 3" once more, the button 3" may be fixed to a square pillar 73" of the lower base 7". Accordingly, the shoe string 15" may be secured in an adjusted state to adjust only a string.

The above references are incorporated by reference herein where appropriate for appropriate teachings of additional or alternative details, features and/or technical background.

BRIEF DESCRIPTION OF THE DRAWINGS

The embodiments will be described in detail with reference to the following drawings in which like reference numerals refer to like elements wherein.

DETAILED DESCRIPTION

In the present disclosure, 'an assistive force' means an external force provided to assist a strength or a power of a user. 'The assistive force' may be provided by an electric motor, hydraulic pump, or actuator (hydraulic, pneumatic, or electric). The assistive force may be a rotation force provided at joints of a wearable assistive device in order to assist a movement of the user at his joints.

In the present disclosure, 'a bending' means being bent in a first direction and extended to be curved or folded in a second direction different from the first direction. In the present disclosure, 'a hinge coupling' means that a coupling body such as a hinge is rotatably coupled about an object to be coupled.

Figure 1:
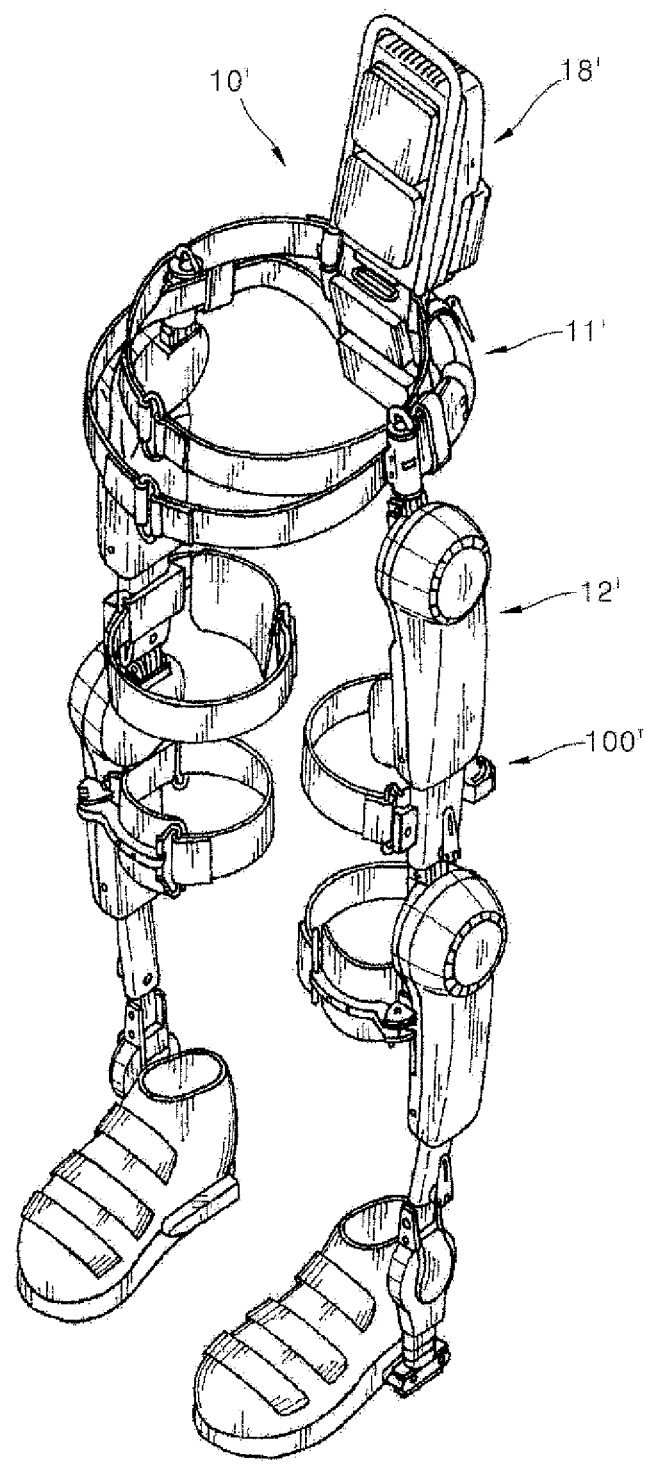
FIG. 1 is a configuration view of a wearable operation assisting apparatus according to the related art.
Figure 2:
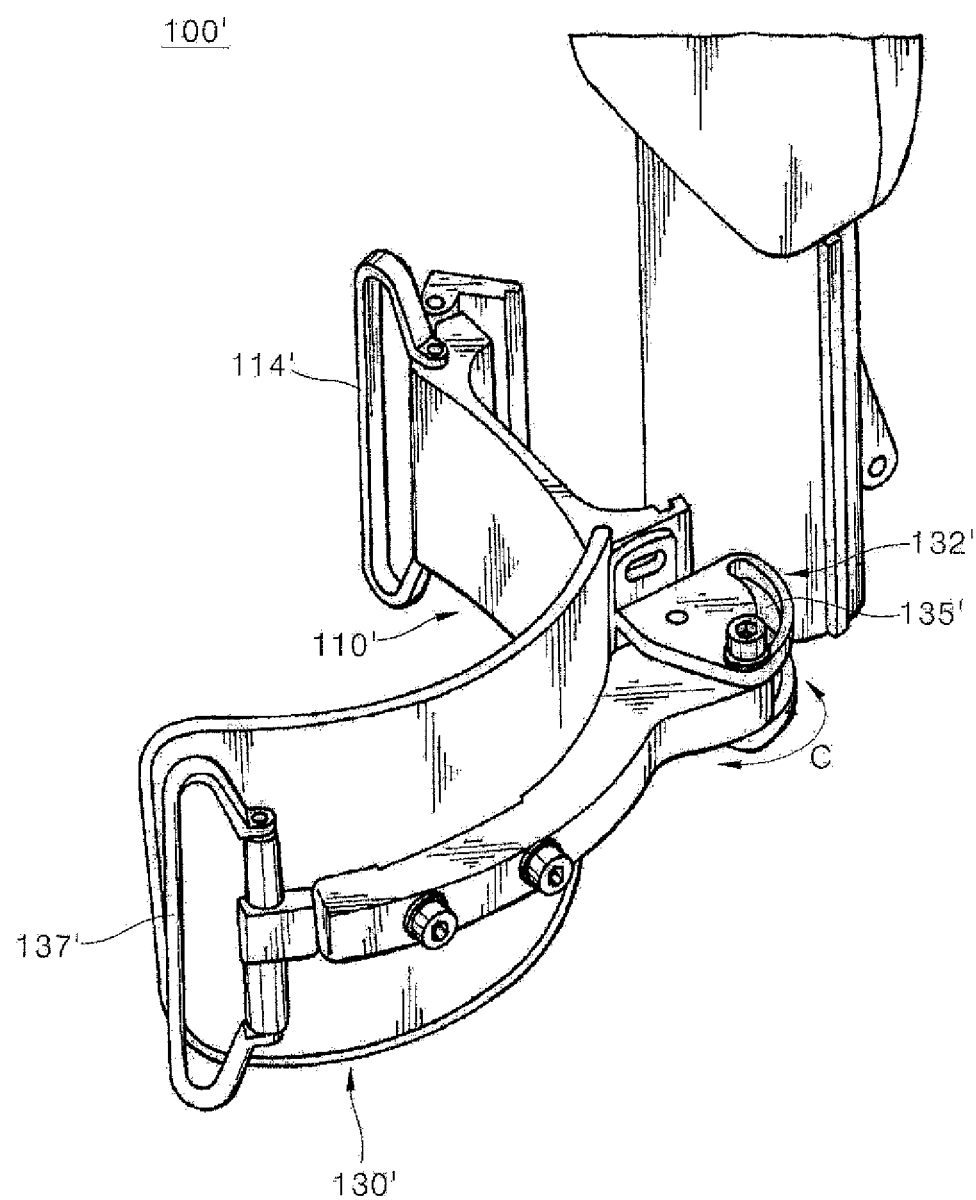
FIG. 2 is a configuration view of a thigh cuff support in the wearable operation assisting apparatus shown in FIG. 1.
Figure 3:
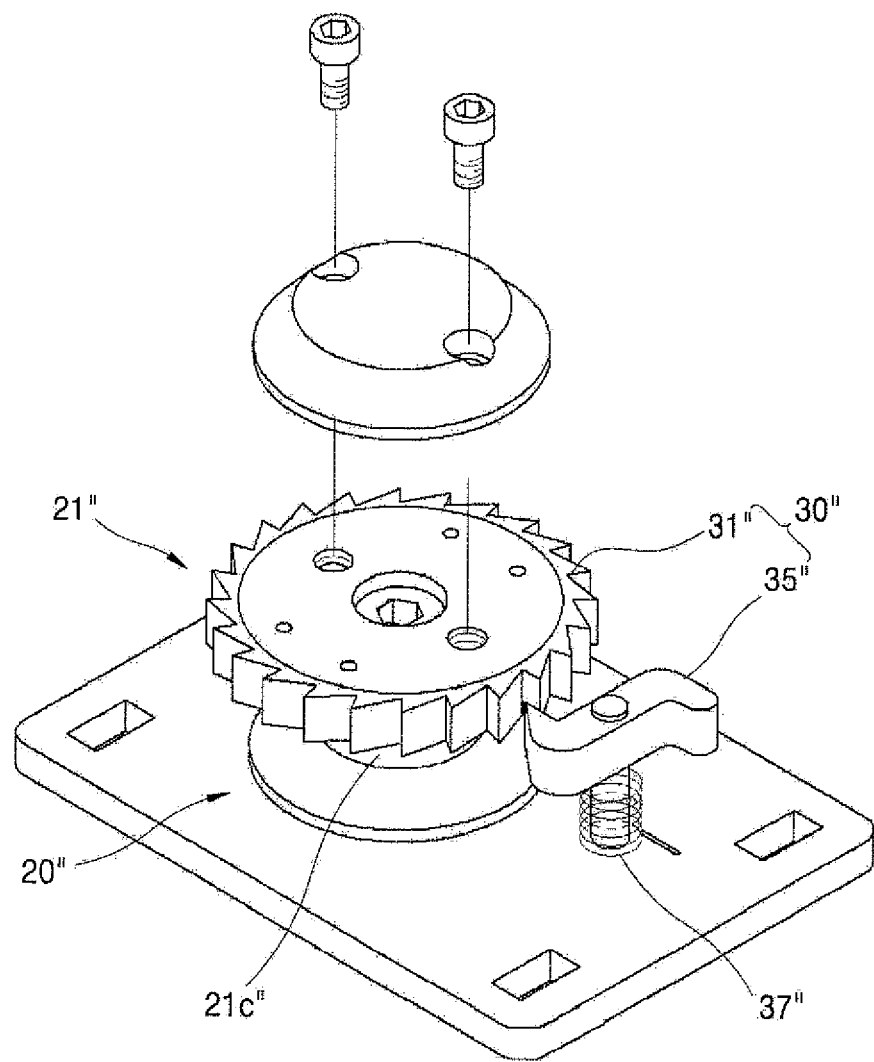
FIG. 3 is a schematic configuration view of a shoelace fastening device according to the related art.
Figure 4:
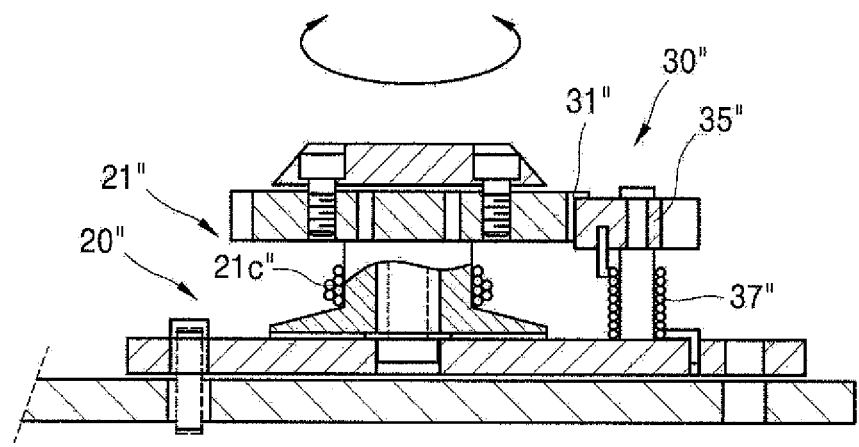
FIG. 4 is a cross-sectional view of the shoelace fastening device shown in FIG. 3.
Figure 5:
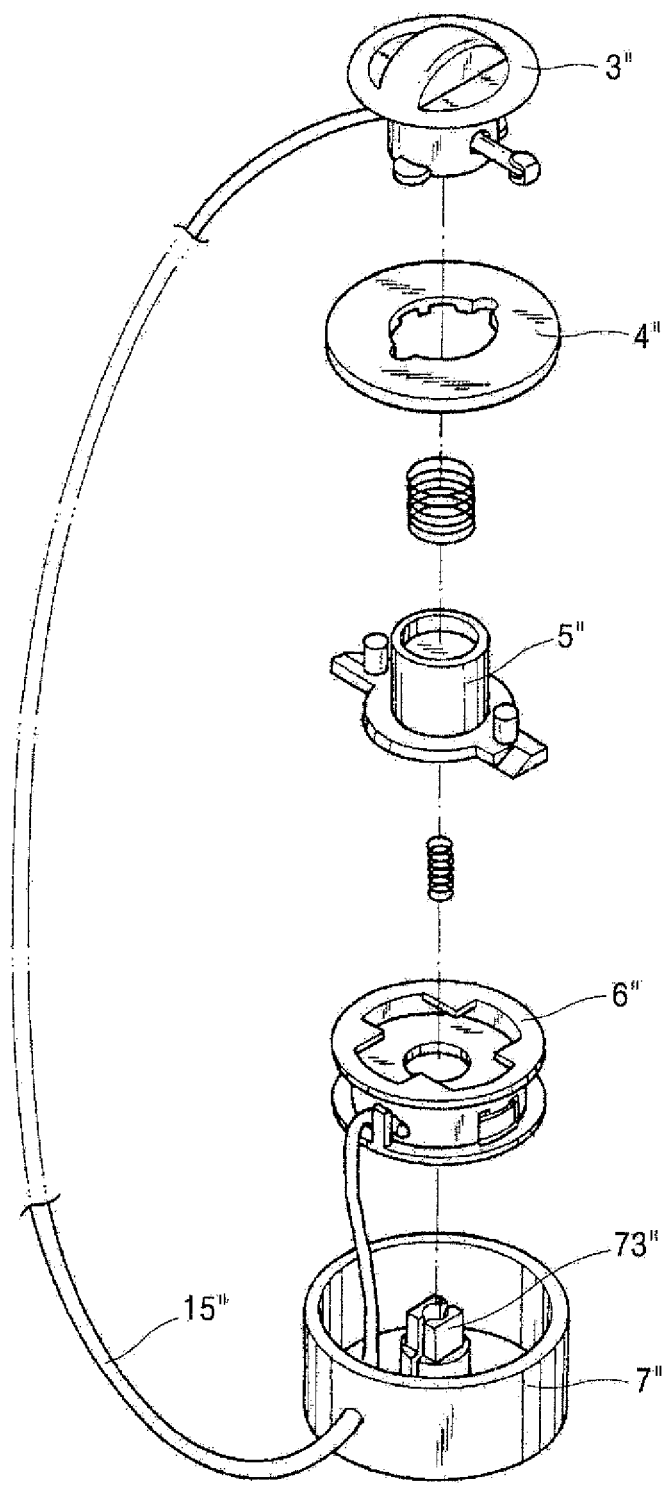
FIG. 5 is a configuration view schematically showing a shoelace adjustment mechanism according to the related art.
Figure 6A:
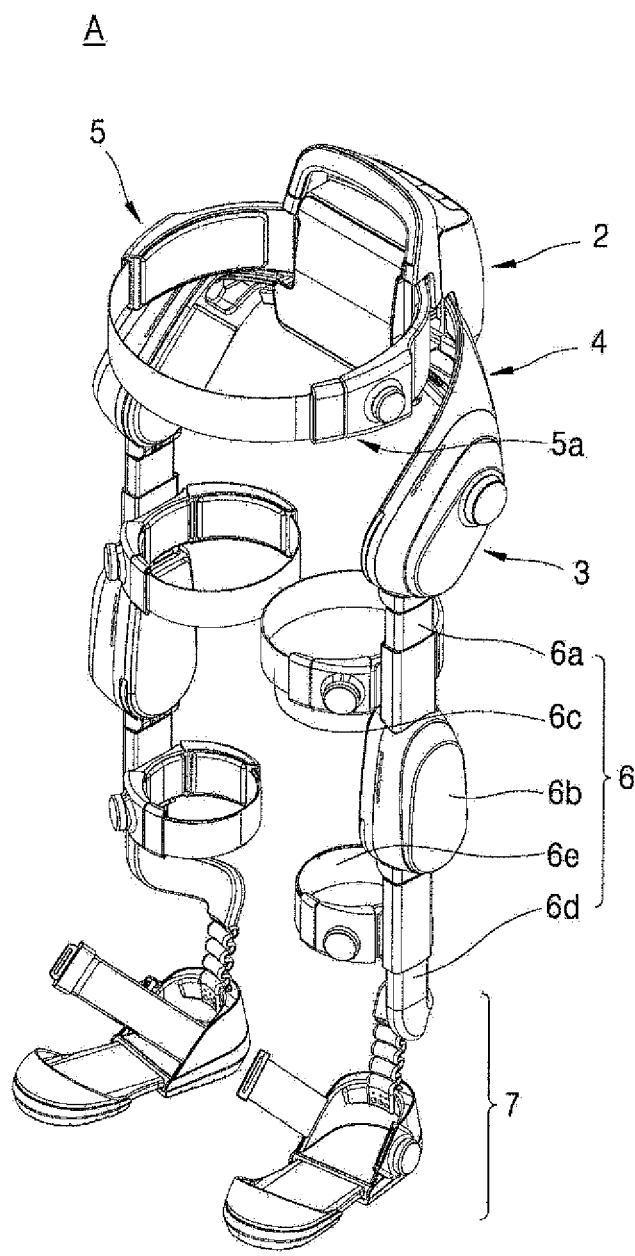
FIG. 6A is a perspective view of a wearable assistive device in accordance with an embodiment.
Figure 7:
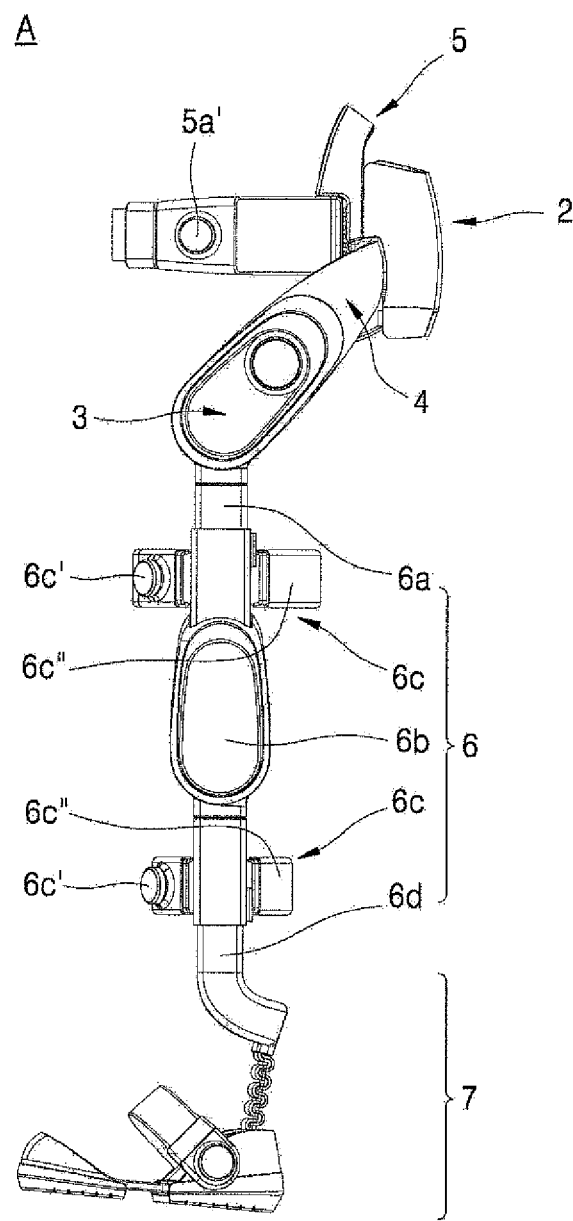
FIG. 7 is a schematic side view of the wearable assistive device shown in FIG. 6A.

FIG. 6A is a perspective view of a wearable assistive device such as a wearable robot, e.g., exoskeleton, in accordance with an embodiment. FIG. 7 is a schematic side view of the exoskeleton in FIG. 6A.

When the user wears a wearable assistive device such as a wearable robot A, and specifically an exoskeleton, on a lower body and walks, bends, or lifts, the exoskeleton A may assist a lower body power or strength of a user. The wearable exoskeleton A may include a lumbar/back frame 2, an actuated hip joint 3, a main frame 4, a subframe or waist/pelvic frame 5, a leg assembly or leg 6, and a foot assembly or foot support 7.

When the user wears the exoskeleton A, the lumbar/back frame 2 may be provided at a rear or back, e.g., lumbar, of the user. The lumbar/back frame 2 may house a main controller to adjust a width of the main frame 4 to fit a waist or pelvis size of the user. The lumbar/back frame 2 may have a battery pack or power supply to power or charge the main controller 2. The lumbar/back frame 2 may be coupled to the subframe 5.

The subframe 5 may be worn on or secured to the waist of the user to support the waist of the user. The subframe 5 may include a waist belt 5a. The waist belt 5a may include a button dial or button 5a' and a belt or strap 5a". The user may detach the belt 5a" using the button 5a', and may also adjust a length of the belt 5a" via the button 5a'. Accordingly, the waist of the user may be secured to the exoskeleton A. Aside of the subframe 5 in contact with the waist of the user may be made of a shock-absorbent material or a material capable of absorbing an impact to improve comfort.

The main frame 4 may be coupled to the lumbar/back frame 2. The main frame 4 may have a shape that covers a first side of a pelvis, e.g., ilium, of the user to a second side thereof. The main frame 4 may be formed in a substantially 'U'-shape.

A bent portion or center of the main frame 4 may be provided at a rear or back of the user. The lumbar/back frame 2 may be provided at the bent portion of the main frame 4. The main frame 4 may have a first end and a second end which may extend in a downward direction along the hips or ilium of the user. Details of the main frame 4 may be found in U.S. application Ser. No. 16/282,458 filed on Feb. 22, 2019, the entire contents of which are incorporated by reference herein.

The actuated hip joint 3 may be provided between the main frame 4 and the leg assembly 6. The actuated hip joint 3 may have a subcontroller to adjust a strength or magnitude of an assistive force that assists a power or strength of the user at the hip joint. The subcontroller or the main frame 4 may include a dial or knob so that the user may adjust the magnitude of the assistive force. The subcontroller or main frame 4 may be provided with an indicator to indicate the present magnitude of the assistive force, and may include or communicate with a lamp, light, or light-emitting device such as a light-emitting diode (LED). At the actuated hip joint 3, a driving means such as a motor or actuator (e.g., electric, hydraulic, or pneumatic) that generates an assistive force may be provided. The leg assembly 6 may be coupled to a lower side of the actuated hip joint 3.

The leg assembly 6 may be made in pair to be worn on both legs of the user, respectively. Each leg assembly 6 may include an upper leg frame 6a, an actuated joint 6b, a lower leg frame 6d, and leg belts 6c and 6e.

The upper leg frame 6a may be connected to the main frame 4. The upper leg frame 6a may support and secure to a thigh of a user via the leg belt 6c. A lower end of the upper leg frame 6a may be connected to the lower leg frame 6d via the actuated joint 6b, which may include a driving means such as a motor or actuator (e.g., electric, hydraulic, or pneumatic) that generates an assistive force. For reference, the actuated joint 6b and actuated hip joint 3 may include various driving means or drives capable of generating the assisting force.

The lower leg frame 6d may support and secure to a calf of the user via the leg belt 6e. The leg belt 6c may include a button dial or button 6c' and a belt or strap 6c". The user may detach the belt 6c" by using the button 6c'. The user may further adjust a length of the belt 6c" by using the button 6c'. An operation of the leg belt 6e may be the same or similar to an operation of the leg belt 6c.

The upper leg frame 6a, the actuated joint 6b, and the lower leg frame 6d may extend along a side of the leg of the user so as not to interfere with a natural bending of the user's joints when he walks, bends, or lifts, improving convenience. The actuated joint 6b may move to correspond with a movement of the knee joint of the user. Similarly, the actuated hip joint 3 may move to correspond with a movement of the hip joint of the user. The upper leg frame 6a may extend forward or backward in a sagittal plane of motion from the actuated hip joint 3, and the lower leg frame 6d may extend forward or backward in the sagittal plane from the actuated joint 6b.

Details of the main controller, subcontroller, actuated hip joint 3, and actuated joint 6b can be found in U.S. application Ser. No. 16/274,584 filed on Feb. 13, 2019 and Ser. No. 16/274,613 filed on Feb. 13, 2019, the entire contents of which are incorporated by reference herein.

The upper leg frame 6a may be extended in a frontal plane of motion inward and outward, e.g., to right and left sides, by a predetermined angle by a hip joint structure (not shown) of the main frame 4. The upper leg frame 6a and the lower leg frame 6d may have a multi-joint structure capable of adjusting an inclination inward or outward to accommodate different sizes of the thigh and calf of the user, respectively. The upper leg frame 6a and the lower leg frame 6d may additionally have multi-frame structures to adjust lengths of the upper leg frame 6a and the lower leg frame 6d. Details of the hip joint structure of the main frame 4, and the multi-joint and multi-frame structures of the upper and lower leg frames 6a and 6d may be found in U.S. application Ser. No. 16/282,458 filed on Feb. 22, 2019, the entire contents of which are incorporated herein by reference.

The foot support 7 may secure and support a foot or shoe of the user and may be coupled to a lower end of the lower leg frame 6d. For convenience of description, an example where the shoes of the user are fixed to the foot support 7 will be briefly described. A length of a sole of the foot support 7 may be adjustable to accommodate various shoe sizes of the user. The foot support 7 may include a belt or strap to secure the shoes. The foot support 7 can be formed in a shape corresponding to the shoes of the user. The strap of the foot support 7 may have the same or similar structure to a structure of the leg belts 6c and 6e and the waist belt 5a of the present disclosure. Details of the foot support 7 may be found in U.S. application Ser. No. 16/274,560 (DAE-0072) filed on Feb. 13, 2019, and U.S. application Ser. No. 16/274,798 (DAE-0095) filed on Feb. 13, 2019, the entire contents of which are incorporated by reference herein.

The exoskeleton A is not limited to a lower body exoskeleton. The foot support 7 may be optional, and the exoskeleton A may be an upper body exoskeleton, lower body exoskeleton, or an exoskeleton configured to be supported on an entire body of a user. For example, exoskeleton A may instead be an upper body exoskeleton, which may have a lumbar/back support 2 housing a main controller, a main frame 4, a subframe 5, a limb assembly 6 extending upward from the main frame 4, and at least one actuated joint 3 or 6b. An exoskeleton A may also fit onto a complete or entire body of the user to accommodate both leg and arm limbs.

Figure 6B:
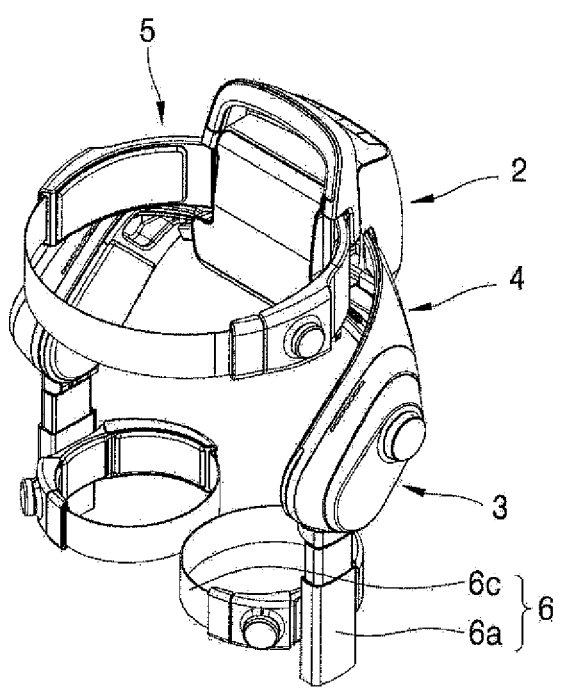
FIG. 6B is a perspective view of a wearable assistive device according to the other embodiment.

Furthermore, embodiments disclosed herein may not be limited to a complete lower body exoskeleton based on an intended use of the exoskeleton. For example, Referring to FIG. 6B the actuated joint 6b, the lower leg frame 6d, the leg belt 6e, and the foot support 7 may be omitted. Thus, an exoskeleton A may provide assistance to the user at the actuated hip joint 3, and may include a main frame 4, a lumbar/back frame 2, and a leg assembly 6 that includes only an upper leg frame 6a that secures to a thigh of the user via a leg belt 6c. Such an upper leg exoskeleton A may have a hip structure substantially the same as or similar variations to the hip structure of the main frame 4 described in detail herein.

Figure 8:
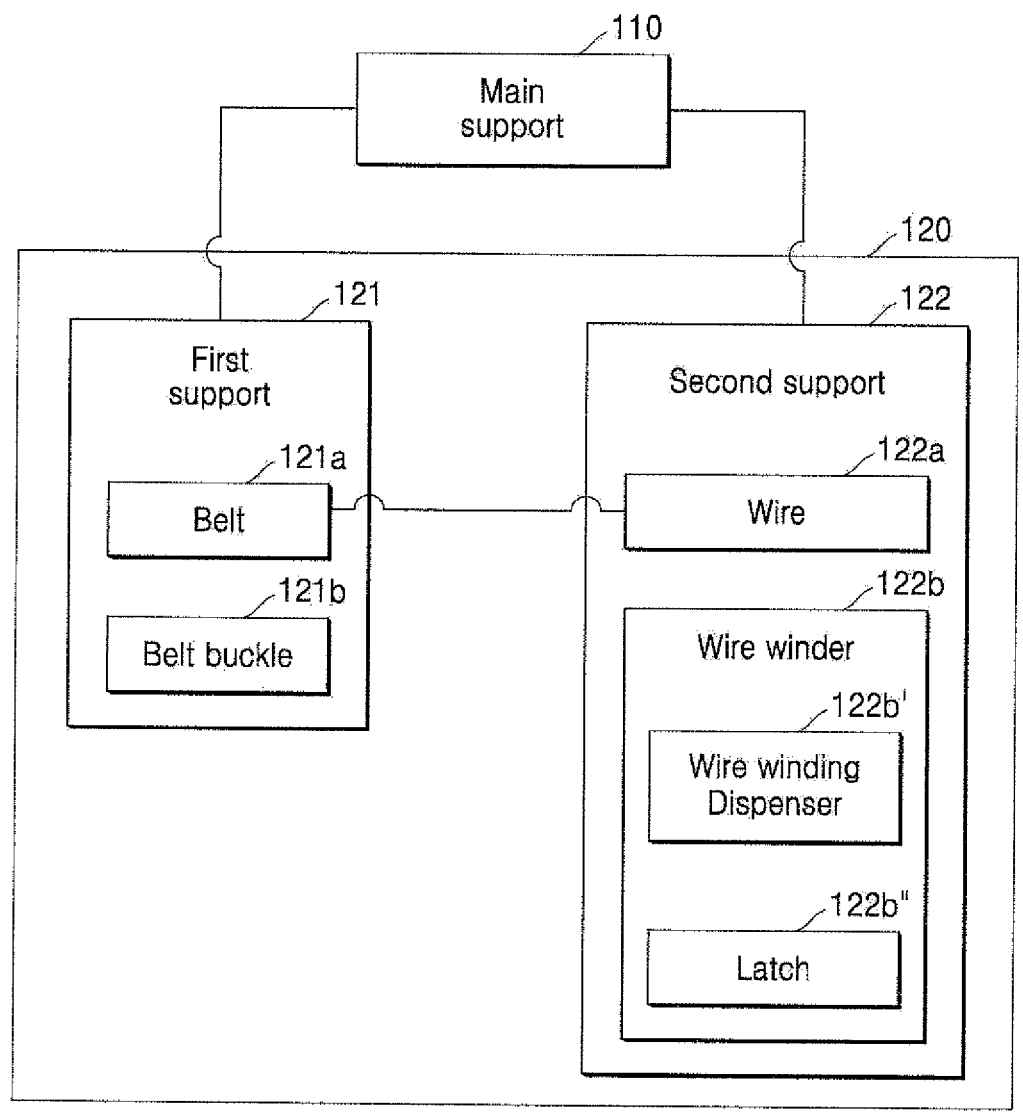
FIG. 8 is a conceptual view of a technical configuration of a leg belt in a wearable assistive device in accordance with an embodiment.

Hereinafter, a belt assembly in accordance with an embodiment will be described in detail. FIG. 8 is a conceptual view of a technical configuration of a belt assembly in an exoskeleton A in accordance with an embodiment.

A belt assembly 100 may be realized as a leg belt, waist belt, and/or a foot support strap, respectively. The belt assembly 100 may include a main support 110 and a sub-support 120. The sub-support 120 may be formed in plurality. As an example of the above, the sub-support 120 may include at least one first support or arm 121 and at least one second support or arm 122. The first support 121 may be rotatably coupled to a first side of the main support 110. The second support 122 may be rotatably coupled to a second side of the main support 110. As an alternative, the belt assembly 100 may omit the sub-support 120, or may omit the second support 122 of the sub-support 120.

The first support 121 may include a belt or strap 121a and a belt fastener or buckle 121b. The belt 121a may wrap around a leg or a waist of a user. The belt 121a may be stored in the first support 121 so as to be withdrawable and/or retractable. The belt 121a may be connected to a first end of the belt buckle 121b. A second end of the belt buckle 121b may be detachably coupled to the second support 122 to secure the belt assembly 100.

The second support 122 may include a wire 122a and a wire winding structure or a wire winder 122b. A first end of the wire 122a may be connected to the belt 121a and a second end of the wire 122a may be connected to the wire winder 122b. The wire winder 122b may include a wire winding member 122b', which may be one of a reel, bobbin and spindle, and a latch holder or latch 122b". For convenience of description, the wire winding member 122b' will be described as a reel. The wire 122a may be wound on the reel 122b', which may be provided in an optional wire winding body or reel case. The belt buckle 121b may be coupled to the latch 122b" so as to be detachable. The wire winder 122b thus may simultaneously perform a winding of the belt 121a via the reel 122b', and a fastening and unfastening of the belt buckle 121b via the latch 122b".

When the wire is wound on the reel 122b' of the wire winder 122b, the belt 121a may be stored inside of the first support 121. A space or opening between the first support 121 and the second support 122 may form an open area of the belt assembly 100. The leg or the waist of the user may be inserted into the belt assembly 100 through the open area. The belt buckle 121b may be detachably coupled or fastened to the second support 122 while the belt 121a is withdrawn from the first support 121.

The leg or waist of the user may primarily be supported by the main support 110. The leg or waist of the user may further be supported at first and second sides by the first support 121 and the second support 122. The first support 121 and the second support 122 may include a curved surface that covers the leg or waist of the user, and may be rotatably coupled to the main support 110. Accordingly, the belt assembly 100 may have a structure to effectively support the leg or waist of the user.

Due to the adjustable belt assembly 100, various waist and leg sizes may be secured to the belt assembly 100. When the belt assembly 100 is not secured to the leg or the waist of the user, the belt 121a may be stored in the first support 121. Accordingly, contamination and damage may be prevented.

Figure 9:
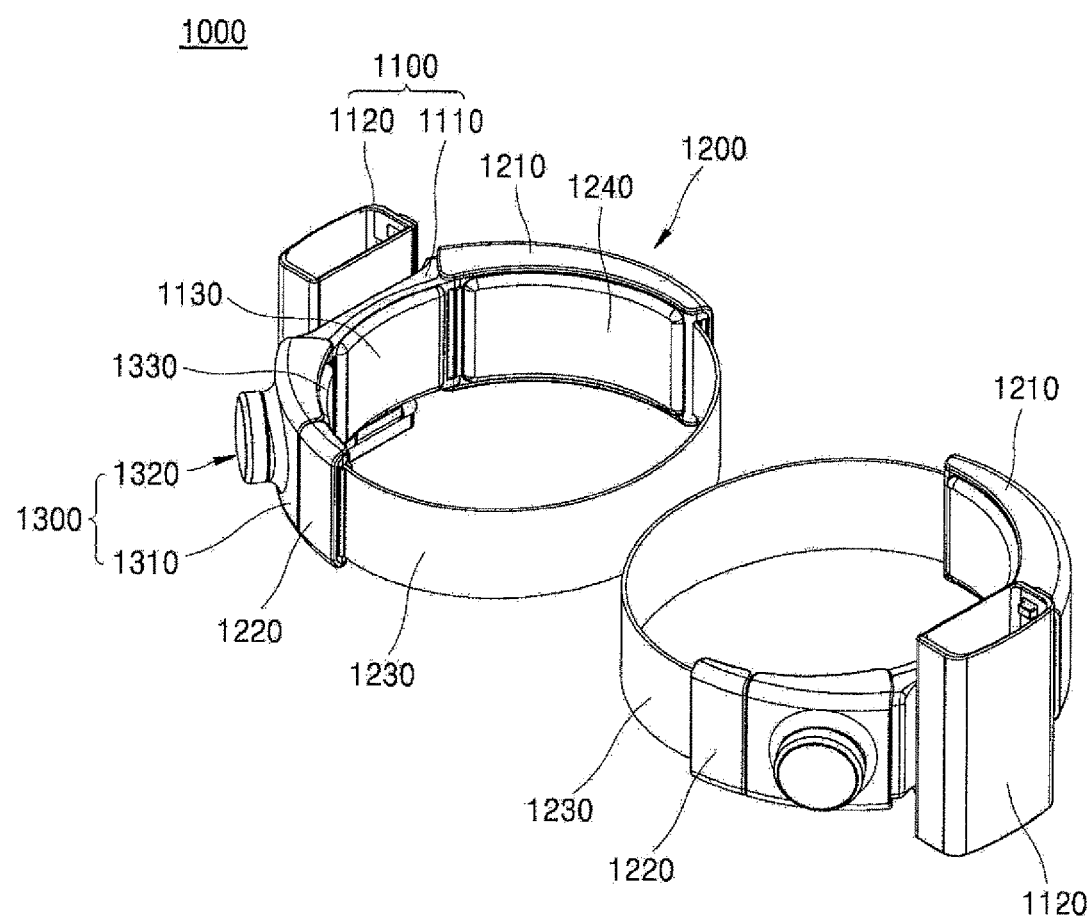
FIG. 9 is a perspective view schematically showing a leg belt in accordance with an embodiment in the wearable assistive device shown in FIG. 6A.
Figure 10:
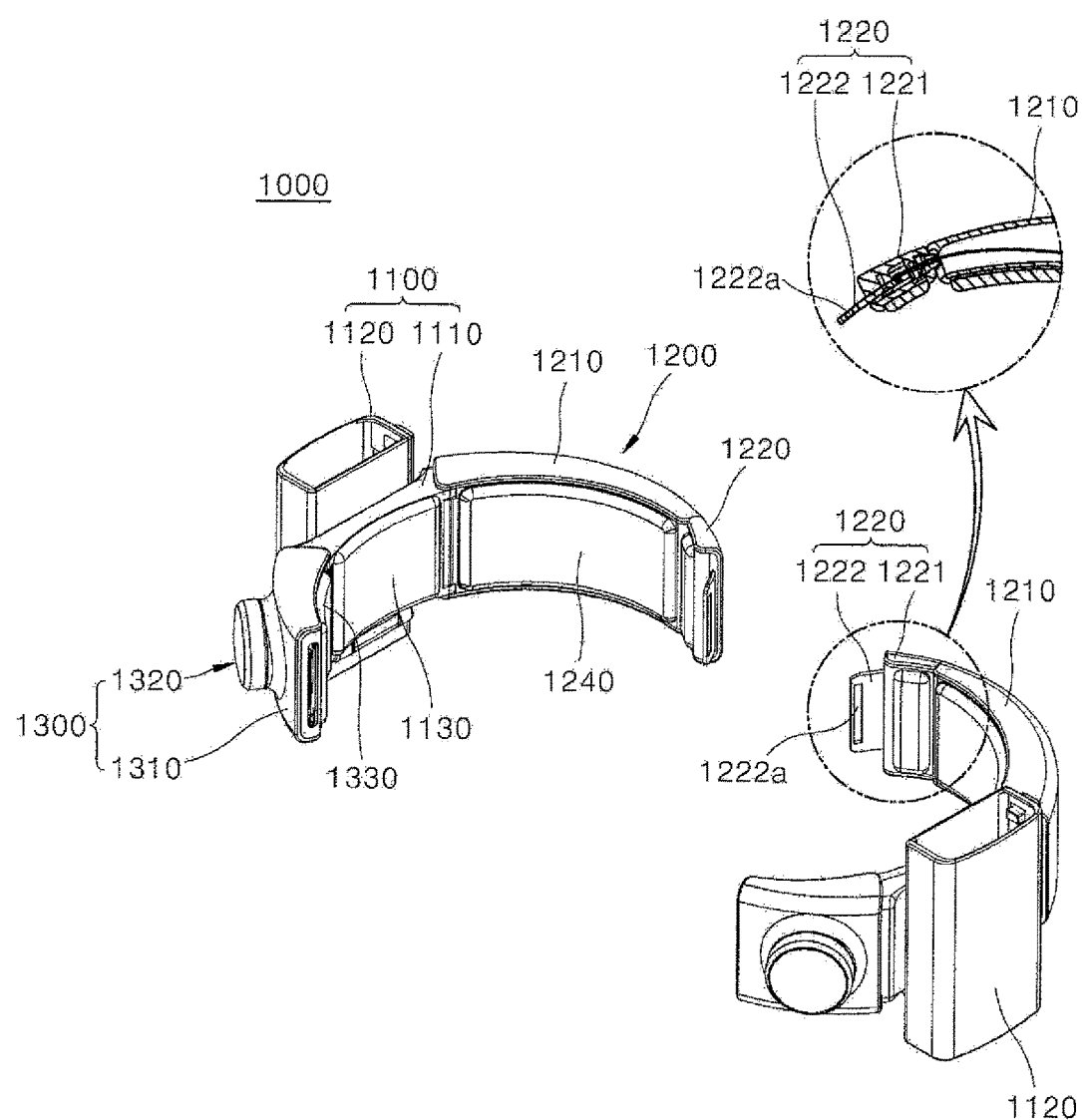
FIG. 10 is a configuration view schematically showing a state in which a coupling of the buckle is released in the leg belt shown in FIG. 9.
Figure 11:
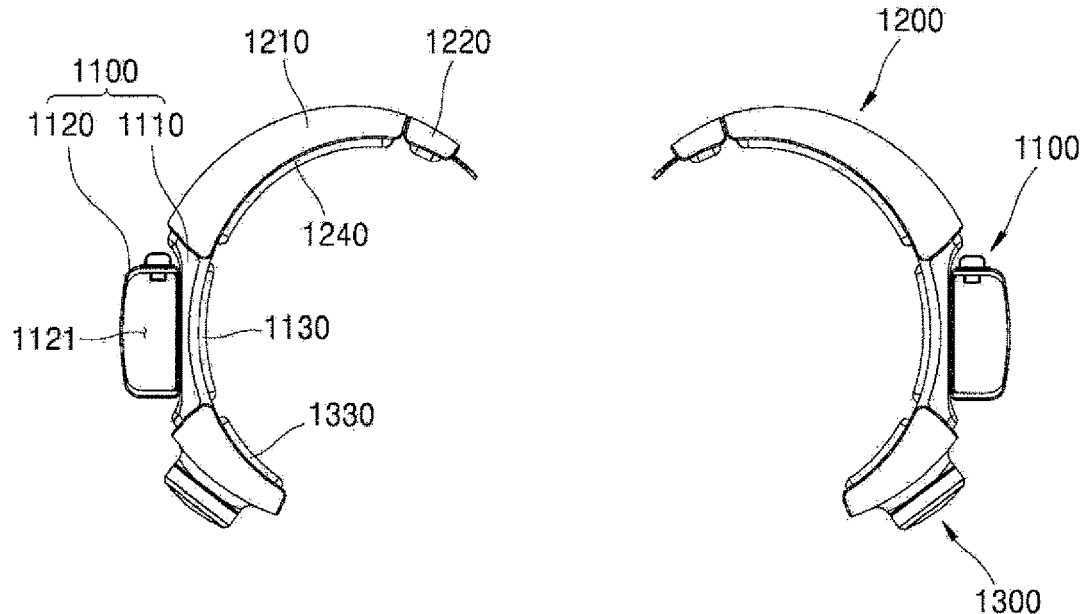
FIG. 11 is a schematic top view of the leg belt shown in FIG. 10.

FIG. 9 is a perspective view schematically showing a leg belt in accordance with an embodiment in the exoskeleton of FIG. 8. FIG. 10 is a configuration view schematically showing a state in which a coupling of a belt buckle is released in the leg belt shown in FIG. 9. FIG. 11 is a schematic top view of the leg belt shown in FIG. 10.

A leg belt 1000 may be realized as the leg belts 6c and 6d that are mounted on upper and lower leg frames 6a and 6d (FIG. 6A), respectively. When the exoskeleton A has two leg assemblies each having multiple leg belts 1000, the leg belts 1000 of each leg assembly may have symmetric shapes (as represented in FIG. 9) so that the user can perform similar operations with both legs.

The leg belt 1000 may include a main support 1100, at least one first support or arm 1200, and at least one second support or arm 1300. The first support 1200 may be coupled to a first side of the main support 1100. The second support 1300 may be coupled to a second side of the main support 1100. Alternatively, the leg belt 1000 may omit the second support 1300 and/or the first support 1200.

The main support 1100 may include a main frame 1110 and a leg coupling frame or leg connector 1120 that connects the leg belt 1000 to the leg assembly 6. The main frame 1110 may contact and support a leg of the user, and may be formed in a rectangular frame shape having a curved surface. A detailed shape of the main frame 1110 will be described in detail with reference to FIG. 22.

The leg of the user may be supported in an inner side of the main frame 1110, and the leg connector 1120 may be coupled to an outside of the main frame 1110. The leg connector 1120 may couple the main frame 1110 to the upper or lower leg frame 6a or 6d and may be formed as a rectangular frame. A receiving hole or opening 1121 may be formed in the leg connector 1120 so that the upper or lower leg frame 6a or 6d may be inserted into the receiving hole 1121.

The first support 1200 may include a first subframe or first frame 1210, a belt fastener or buckle 1220, and a belt or strap 1230. The first frame 1210 may be coupled to the main frame 1110 of the main support 1100 by a hinge joint or hinge. A detailed shape of the first frame 1210 will be described in more detail with reference to FIG. 22.

The belt buckle 1220 may include a buckle body or base 1221 and a buckle plate or tongue 1222. The belt 1230 may be coupled to a first side of the buckle base 1221, and the buckle plate 1222 may be coupled to a second side of the buckle base 1221. The buckle plate 1222 may be detachably coupled to the second support 1300. The buckle plate 1222 may be formed with a slit or latch ring 1222a into which a latch stick 1323a (FIG. 13) may be inserted. The latch stick 1323a and a coupling of the buckle plate 1222 to the second support 1300 will be described later.

A first side of the belt 1230 may be connected to the buckle base 1221 and a second side of the belt 1230 may be stored in the first frame 1210 so as to be retractable and withdrawable. Accordingly, the buckle base 1221 may contact the first frame 1210 when the belt 1230 is completely retracted or stored in the first frame 1210. Further, the belt 1230 may be elastic.

The second support 1300 may include a second frame 1310 and a wire winding assembly or a wire winder 1320. A leg of the user may be supported in an inner side of the second frame 1310, and the wire winder 1320 may be coupled to an outside of the second frame 1310. In order to effectively support the leg of the user, the inside of the second frame 1310 can have a curved surface. The second frame 1310 may be coupled to the main frame 1110 of the main support 1100 by a hinge joint or hinge. A detailed shape of the second frame 1310 will be described in more detail with reference to FIG. 22.

The wire winder 1320 may operate a lock and release of the belt buckle 1220 at the second frame 1310. Further, the wire winder 1320 may operate a winding of a wire 1326 (FIG. 15) connected to the belt 1230. The length of the belt 1230 may be adjusted by an operation of the wire winder 1320. A detailed configuration of the wire winder 1320 and a belt length adjustment will be described later with reference to FIGS. 12 and 13.

When the first frame 1210 and the second frame 1310 are coupled to the main frame 1110, the leg belt 1000 may be formed in a substantially "C"-shape. Inner surfaces of the first frame 1210 and the second frame 1310 may be curved and symmetrical to each other.

Cushions 1130, 1240, and 1330 may be coupled to the main support 1100, the first support 1200, and the second support 1300, respectively. The cushions 1130, 1240, and 1330 may provide a soft texture and a resilience to the user, and may be variously realized by a soft foam or a cushion sheet, for example. The cushions 1130, 1240, and 1330 may be made of a shock-absorbent material and/or a soft material to provide comfort to the user. The cushions 1130, 1240, and 1330 may be attached to the main, first, and second supports 1100, 1200, and 1300 by Velcro to facilitate cleaning and replacement.

Figure 12:
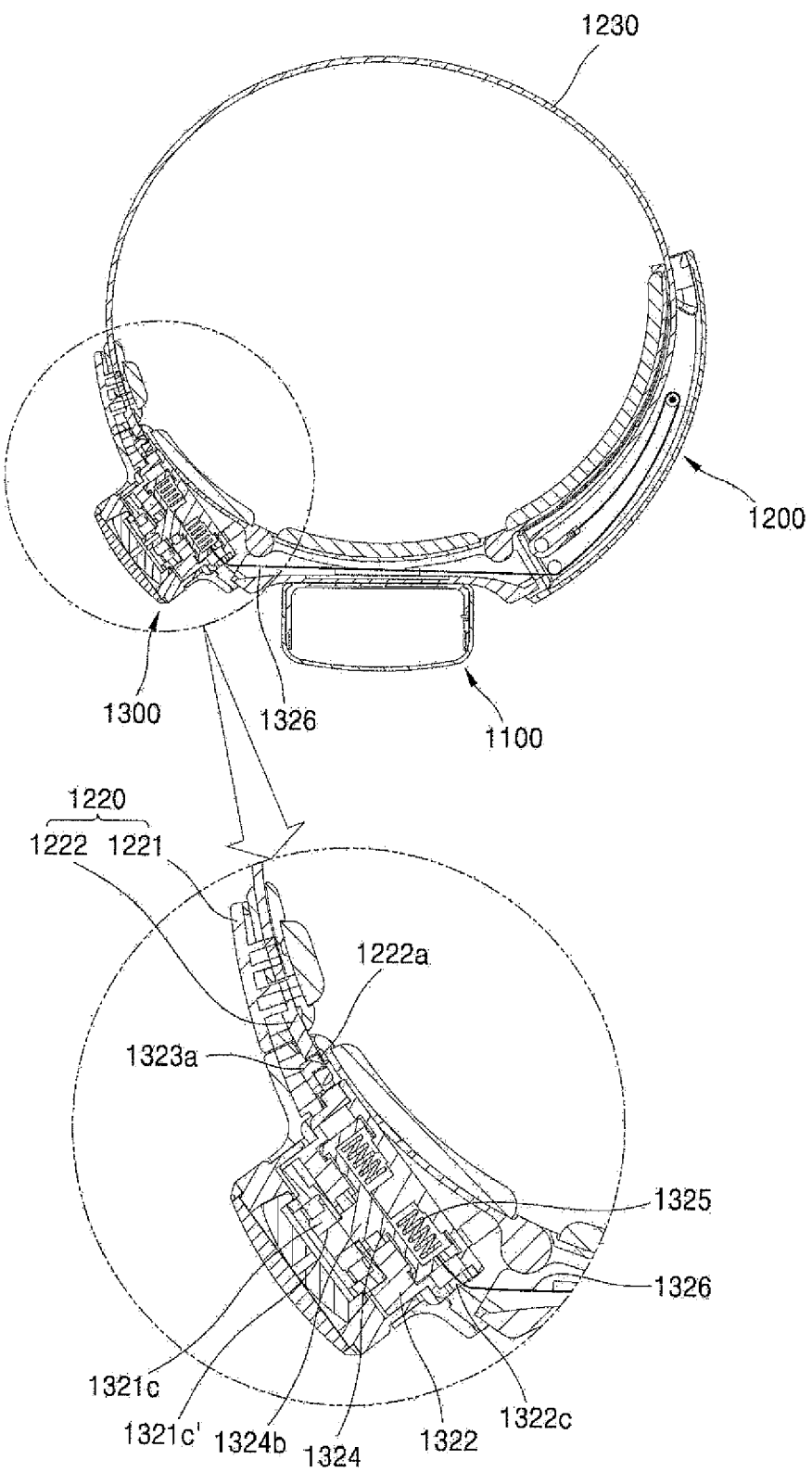
FIG. 12 is a schematic cross-sectional view of the leg fixing portion shown in FIG. 9.
Figure 13:
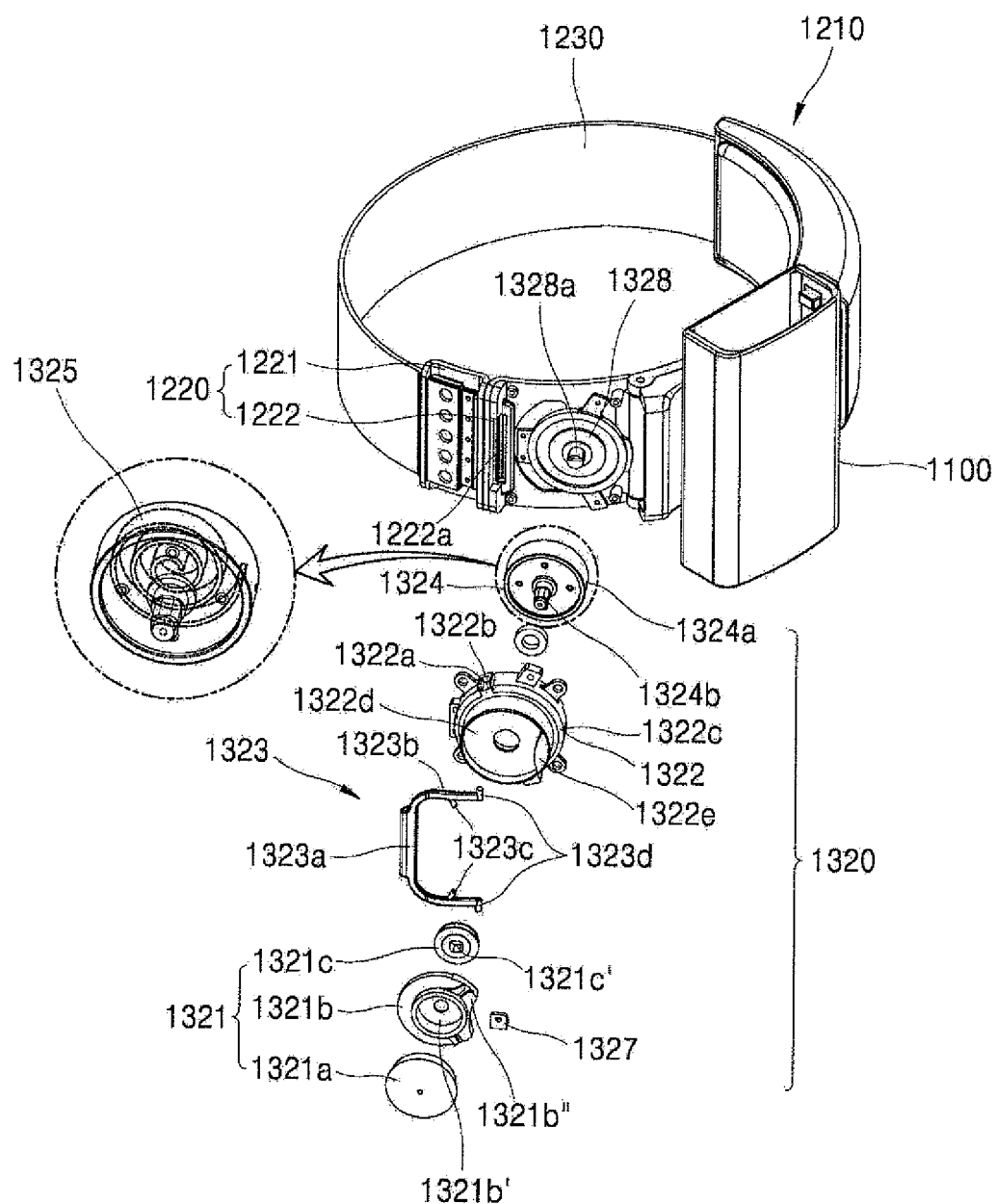
FIG. 13 is a schematic exploded perspective view of the leg belt shown in FIG. 12.

FIG. 12 is a schematic cross-sectional view of the leg shown in FIG. 9. FIG. 13 is a schematic exploded perspective view of the leg belt shown in FIG. 12. With reference to FIGS. 12 and 13, the belt 1230 may be received in the first frame 1210 of the first support 1200 so as to be retractable and withdrawable. The first end of the belt 1230 may be coupled to the belt buckle 1220 and the second end of the belt or strap 1230 may be coupled to a wire 1326 (FIG. 13). As described previously, the belt buckle 1220 may include the buckle base 1221 and the buckle plate 1222. The belt 1230 may be coupled to the first end of the buckle base 1221, and the buckle plate 1222 may be coupled to the second end of the buckle base 1221.

The buckle plate 1222 may be formed with a slit or latch ring 1222a. The slit 1222a may be formed so as to extend in a direction orthogonal to a direction in which the buckle plate 1222 is inserted into the second frame 1310 (shown as an arrow D in FIG. 13). The slit 1222a may be a hole or an opening having a length in the longitudinal direction of the buckle plate 1222, or other appropriate shape based on the structure for latching or securing the buckle plate 1222.

A wire winder 1320 may be provided in the second frame 1310 of the second support 1300. The wire winder 1320 may include a button dial 1321, a wire winding body or a case 1322, a latch holder or latch hook 1323, a wire winding dispenser 1324 which may be one of a reel, bobbin, and spindle, a plate spring 1325, the wire 1326, a latch fixer or lock 1327, and a base plate 1328. For convenience of description, the wire winding dispenser 1324 will be referenced as a wire reel 1324, and the case 1322 will be referenced as a reel case 1322. The latch hook 1323 may also be referred to as a latch assembly.

Figure 15:
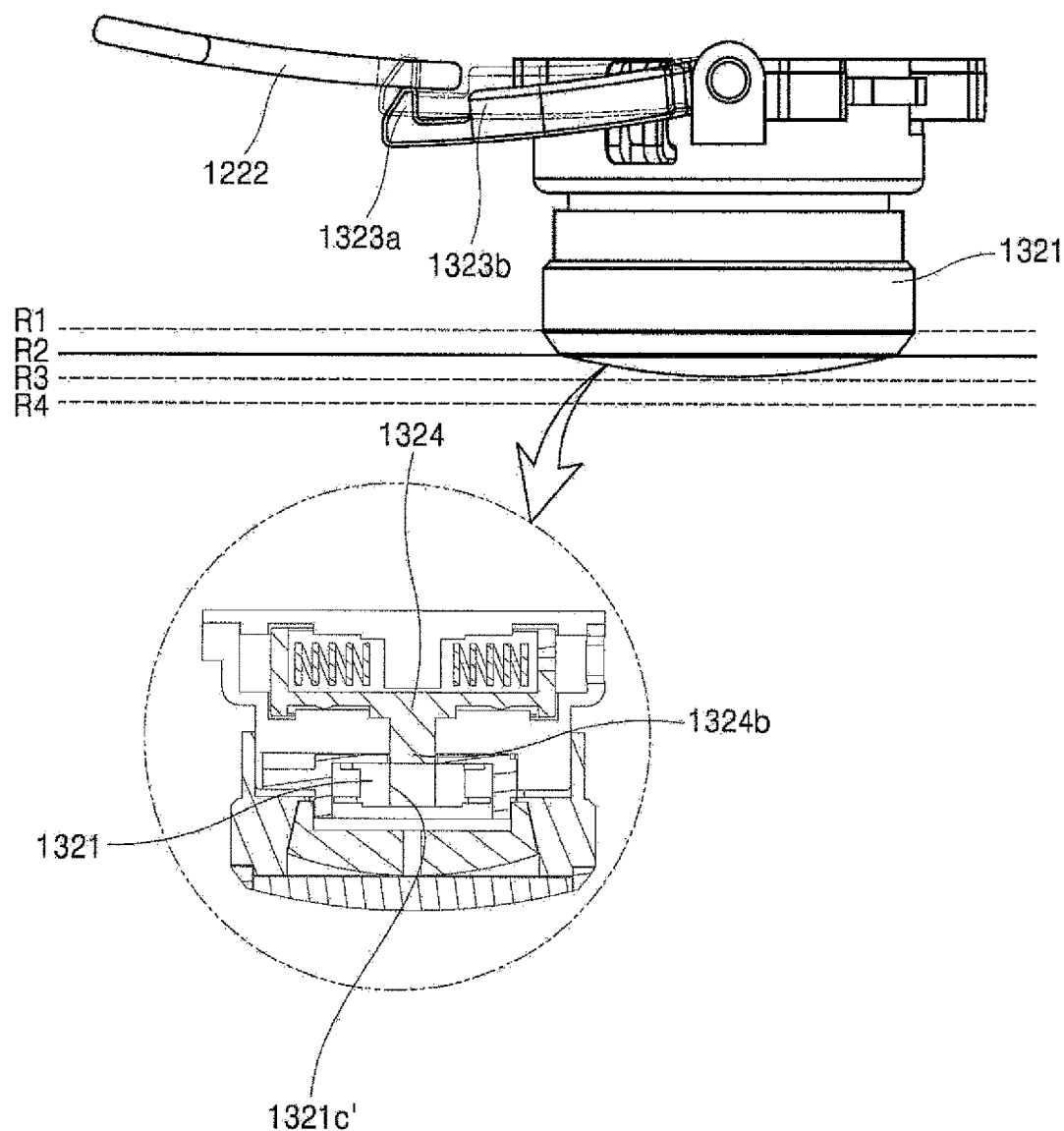
FIG. 15 is a schematic side view of the leg fixing portion shown in FIG. 14.

The button dial 1321 may be coupled to the reel case 1322 so as to enable a linear movement, e.g., an outward movement in the direction of arrow F3 in FIG. 15, so that an operation of the latch hook 1323 may be possible. The button dial 1321 may be coupled to the reel case 1322, and may also move rotationally to wind the wire 1326. A coupling structure capable of linearly and rotationally moving the button dial 1321 and the above reel case 1322 will be described in detail through a detailed shape of the button dial 1321 and reel case 1322.

The button dial 1321 may include a button 1321*a*, a dial body 1321*b*, and a wire operator or inner disc 1321*c*. The dial body 1321*b* may have a cylindrical shape to facilitate at least one of a rotational or a linear movement. The button 1321*a* and the inner disc 1321*c* may be coupled to the dial body 1321*b*. The dial body 1321*b* may be formed with a button groove or recess 1321*b*'. Further, the button recess 1321*b*' may be formed in an outer side of the dial body 1321*b*, and the button 1321*a* may be inserted into and coupled to the button recess 1321*b*'. The button 1321*a* may be pressed/friction fitted into the button recess 1321*b*' of the dial body 1321*b*.

The inner disc 1321*c* may be coupled to an inner side of the dial body 1321*b*. A winder hole or a projection hole 1321*c*' may be formed in the inner disc 1321*c*. The projection hole 1321*c*' may also be referred to as a projection hole. With a linear movement of the inner disc 1321*c* via a linear movement of the button dial 1321, the projection hole 1321*c*" may be selectively coupled to a projection or protrusion 1324*b* on an outer side of the wire reel 1324. The wire reel 1324 may be rotated through a rotation of the button dial 1321.

A first end of the latch hook 1323 may be coupled to the dial body 1321*b* and a second end of the latch hook 1323 may be selectively inserted into the slit 1222*a* of the buckle plate 1222. When the buckle plate 1222 is inserted in a direction of an arrow F1 (FIG. 13) the second end of the latch hook 1323 may be selectively inserted into the slit 1222*a* of the buckle plate 1222, and a movement of the buckle plate 1222 in a direction opposite the direction of the arrow F1 may be limited. Accordingly, the latch hook 1323 may limit a movement of the buckle plate 1222.

The latch hook 1323 may include a latch stick 1323*a* protruding from a latch body 1323*b*, at least one inner latch projection 1323*c*, and at least one outer latch projection 1323*d*. The latch stick 1323*a* may have a shape corresponding to the slit 1222*a*. The latch stick 1323*a* may be formed to protrude from a vertical or longitudinal section of the latch body 1323*b*, The inner latch projection 1323*c* may be formed on an inner side of the latch body 1323*b*, while the outer latch projection 1323*d* may be formed on an outer side of the latch body 1323*b*. The inner latch projection 1323*c* may be formed at a center of the horizontal section of the latch body 1323*b*. The outer latch projection 1323*d* may be formed at ends of horizontal or lateral sections of the latch body 1323*b*.

In summary, the latch hook 1323 may be formed in a substantially "⊏"-shape or C-shape. The latch body 1323*b* may have a substantially "⊏"-shape or C-shape such that the vertical section extends between two horizontal sections. The latch stick 1323*a* may protrude from the vertical section of the latch body 1323*b* and may project outward. Although not shown, the latch stick 1323*a* may have an optional configuration where a vertical length of the latch stick 1323*a* may be longer than the vertical section of the latch body 1323*b* such that the latch stick may extend downward beyond the latch body 1323*b*. Inner latch projections 1323*c* may be projected toward an inside of the horizontal sections so that they mace face each other. The outer latch projection 1323*d* may be formed in pair and may project outward from ends of the horizontal sections of the latch body 1323*b* so that they face away from each other.

The latch hook 1323, the button dial 1321, and the wire reel 1324 may be coupled to the reel case 1322. Further, an outer side of the reel case 1322 may be coupled with the button dial 1321 to move with the button dial 1321, and the wire reel 1324 may be coupled with an inner side of the reel case 1322. The reel case 1322 may thus be provided between the wire reel 1324 and the button dial 1321.

Figure 14:
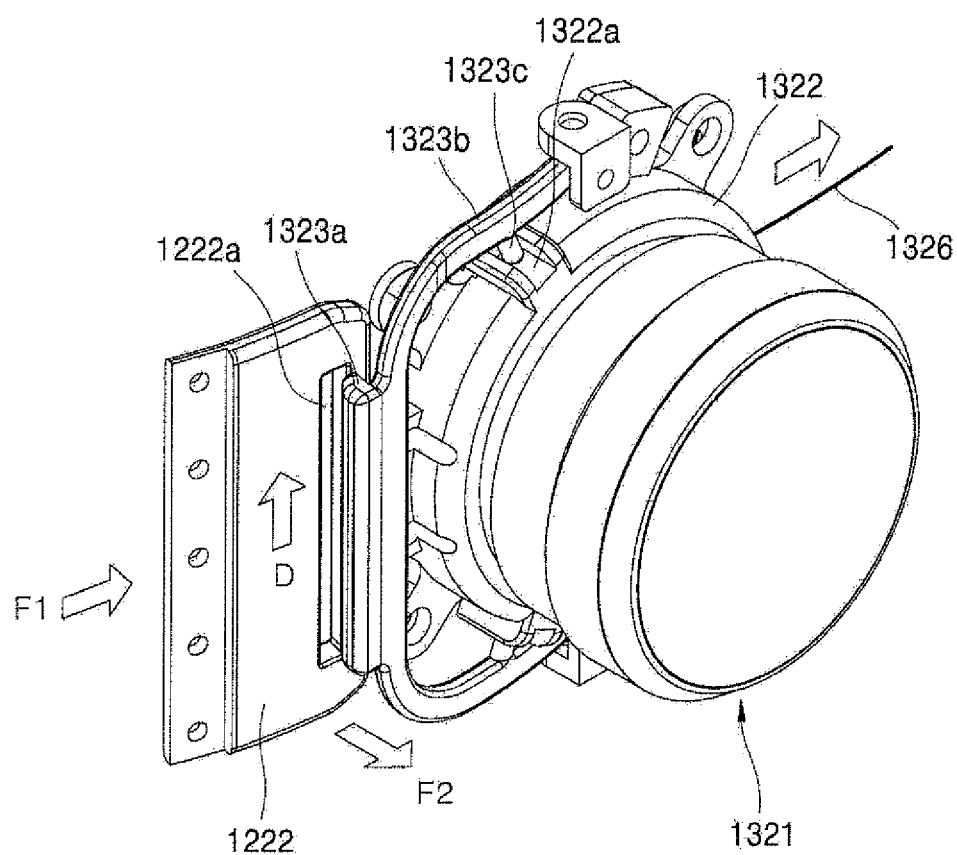
FIG. 14 is a perspective view schematically showing a first state of the leg belt shown in FIG. 9.

A latch groove 1322*a*, a latch support or flange 1322*b*, a wire hole 1322*c*, a button dial receiving groove or button dial recess 1322*d*, and an engaging projection or a projection surface 1322*e* may be formed in the reel case 1322. The projection surface 1322*e* may also be referred to as simply as a projection. The latch groove 1322*a* and the latch support 1322*b* may be provided on an outer circumference of the reel case 1322. The inner latch projection 1323*c* of the latch hook 1323 may be set on the latch groove 1322*a*, and the latch support 1322*b* may restrict a movement of the latch projection 1323*c*. The outer latch projection 1323*d* may be coupled to the reel case 1322 by the latch fixer 1327. The latch fixer 1327 may couple to an outer protruding plate provided on an outer circumference of the reel case 1322. The button dial recess 1322*d* may be formed in an outer side of the reel case 1322 so that the button dial 1321 may be inserted. The button dial 1321 may be pressed or friction fitted into the button dial recess 1322*d*, and so the button dial 1321 may be linearly moved along with a linear movement of the reel case 1322 in inward and outward directions F2 and F3, respectively (FIGS. 13 and 14).

The projection surface 1322*e* may be projected from an inside of the button dial recess 1322*d* and may appear to be a curved surface. A supporting plate or outer plate 1321*b*" of the dial body 1321*b* may have a cut surface corresponding to the projection surface 1322*e*. Another plate or gear 1321*b*" of the dial body 1321*b* may appear to have a shape that corresponds to a shape of the projection surface 1322*e*. The outer plate 1321*b*" may also be referred to as a rack gear. When the outer plate 1321*b*" is not engaged with the projection surface 1322*e*, the reel case 1322 may have a movement independent of a movement of the button dial 1321.

After the button dial 1321 is inserted in the button dial recess 1322*d*, the cut surface of the outer plate 1321*b*" may be supported on or engage with the projection surface 1322*e*, interlocking the reel case 1322 with the button dial 1321. When the button dial 1321 is then pulled in the outward direction, the reel case 1322 may also move outward.

The wire reel 1324 may be coupled to an inner side of the reel case 1322, and may also move in the outward direction when the button dial 1321 is pulled in the outward direction. The wire reel 1324 may be formed in a cylindrical shape and include a hole 1324*a* through which the wire 1326 may be inserted such that it is secured to an interior of the wire reel 1324. The hole 1324*a* may be formed on an outer circumferential surface of the wire reel 1324. In accordance with a rotation of the wire reel 1324, the wire 1326 may be wound on an outer circumferential surface of the wire reel 1324.

A projection 1324*b* may be formed at a center of the wire reel 1324 and may extend from an outer side of the wire reel 1324. When the button dial 1321 is moved linearly inward, the projection 1324*b* may be inserted into the projection hole 1321*c'* of the inner disc 1321*c*, and the wire reel 1324 and the button dial 1321 may be selectively connected so as to be interlocked such that a rotational movement of the wire reel 1324 may be restricted. There may further be a hole in a center of the button dial recess 1322*d* through which the projection 1324*d* may be inserted before being inserted into the projection hole 1321*c'*. When the button dial 1321 is pulled outward and the projection hole 1321*c'* is taken off of the projection 1324*b*, the wire reel 1324 may be disconnected from the button dial 1321 such that it may have an unrestricted free rotational movement. The wire 1326 may penetrate the wire hole 1322*c* to an interior of the reel case 1322. The wire hole 1322*c* may be provided on an outer circumferential surface of the reel case 1322, and the wire 1326 may be secured to an interior of the wire reel 1324 through the wire hole 1322*c* and the hole 1324*a*.

A general operation of the button dial 1321 may include a three step process. In the first step, a user may pull the button dial 1321 outward and secure the slit 1222*a* of the belt buckle 1220 to the latch stick 1323*a* of the latch hook 1323. As a second step, the user may push the button dial 1321 to secure the projection hole 1321*c'* onto the projection 1324*b*, coupling the wire reel 1324, the reel case 1322, and the button dial 1321. The user may, after this step, turn the button dial 1321 to adjust a tightness of the belt 1230. When the user is done using the exoskeleton A, the user may, as a third step, pull the button dial 1321 to decouple the projection 1324*b* from the projection hole 1321*c'* to disconnect the wire reel 1324 from the reel case 1322. The slit 1222*a* may be taken off of the latch stick 1323*a*, and the wire reel 1324 may have a free rotational movement, allowing the wire 1326 to freely wind around the wire reel 1324, and the belt 1230 to retract back into the first support 1200, Details of the retraction of the belt 1230 will be described later.

Figure 17:
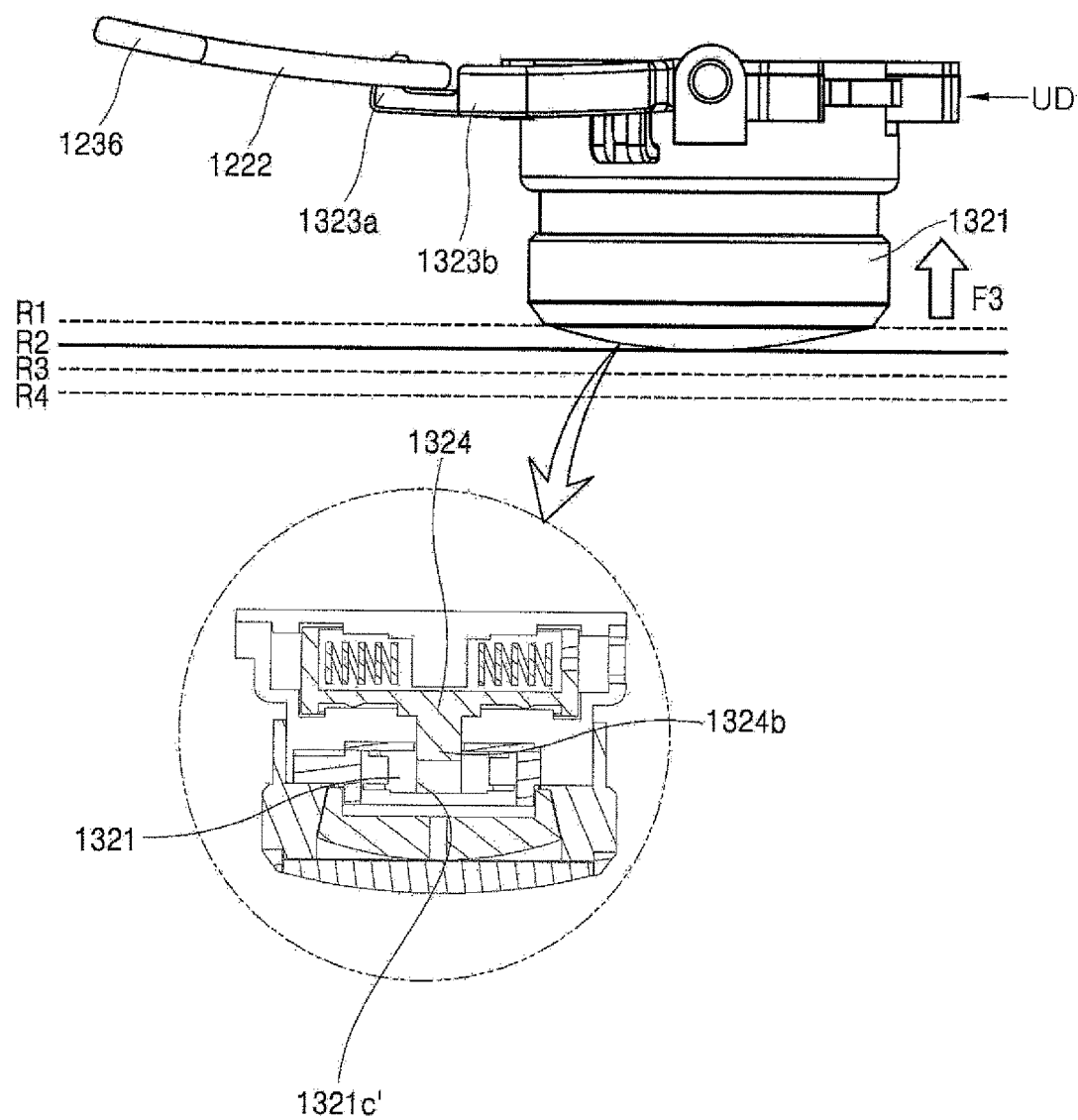
FIG. 17 is a cross-sectional view of the leg belt of FIG. 9 at position R2.

In more detail, referring to FIG. 17, the button dial 1321 may be linearly moveable in increments or steps inside the reel case 1322. A circumference of the button dial recess 1322*d* may include ledges, threads, or grooves, for example, to control a movement of the button dial 1321 in steps. When the button dial is pulled in an outward direction to a first increment (such as R2, R3, or R4 of FIG. 17), there may be a space formed to allow the buckle plate 1222 to be inserted onto or coupled to the latch stick 1323*a*. When the button dial 1321 is pushed to a second increment (such as R1, R2, or R3) of the button dial 1321 that is further inward than the first increment, the projection hole 1321*c'* may be inserted onto or coupled to the projection 1324*b* of the wire reel. When the button dial 1321 is pulled back in the outward direction back to a third increment (such as R1, R2, or R3) of the button dial 1321, the projection hole 1321*c'* may be taken off the projection 1324*b*, and the buckle plate 1222 may be taken off the latch stick 1323*a*.

The third increment may be the same as or different from the first increment. Further, a length of the projection surface 1322*e* may be formed in the reel case 1322 so as to correspond to a position of the button dial 1321 at the third increment. Accordingly, the button dial 1321 may be supported on the projection surface 1322*e*, and a movement of the projection surface 1322*e* may be interlocked with the linear movement of the button dial 1321 and the reel case 1322.

The plate spring 1325, which may be an elastic member, may be provided in the wire reel 1324. A first end of the plate spring 1325 may be connected to the wire reel 1324, and a second end may be connected to the base plate 1328. A resting state of the leg belt 1000 may have the wire 1326 initially wound around the wire reel 1326. When the buckle 1220 is withdrawn from the first support 1200, the wire 1326 may be unwound from the wire reel 1324 to allow the belt 1230 to be withdrawn. The plate spring 1225 may be compressed as the wire reel 1324 rotates in an unwinding or withdrawal direction as the belt 1250 is withdrawn from the first support 1200.

Once the buckle 1220 is fastened to the third support 1300, the belt 1230 may be tightened. The button dial 1321 may be wound in a tightening or winding direction opposite to the unwinding direction, and the wire reel 1324 may also be rotated in the tightening direction. As the wire reel 1324 is rotated in the tightening direction when the buckle 1220 is fastened, the wire 1326 may be rewound around the wire reel 1324.

When the buckle 1220 is unfastened, i.e., when the latch stick 1323*a* withdraws from the slit 1222*a* of the buckle plate 1222, the wire 1326 may be wound on the wire reel 1324 by a restoring force of the plate spring 1325. Accordingly, the belt 1230 may be automatically retracted and stored in the first frame 1210. This process will be described in detail below with reference to FIG. 15.

The wire reel 1324 may be provided at an outer side of the base plate 1328. Further, the base plate 1328 may be formed with a base plate projection 1328*a*, which may be an elastic member. The second end of the plate spring 1325 may be coupled to the base plate projection 1328*a*.

FIG. 13 is a perspective view schematically showing a first state of the leg belt shown in FIG. 9. The projection hole 1321*c'* of the inner disc 1321*c* of the button dial 1321 may be taken off the projection 1324*b* of the wire reel 1324 when the button dial 1321 is at a position shown as R3 in FIG. 15. The wire reel 1324 may be not interlocked with the button dial 1321, and thus may rotate independent to a movement of the button dial 1321, as it is not restricted by the button dial 1321.

When the buckle plate 1222 is pulled out of the first support 1200, the belt 1230 may be withdrawn from the first frame 1210. The wire 1326 connected to the belt 1230 may be withdrawn and unwound from the wire reel 1324. The plate spring 1325 may be compressed in accordance with a rotation in an unwinding or loosening direction of the wire reel 1324.

When the buckle plate 1222 is moved in an insertion direction F1 toward a latch stick 1323*a*, the latch stick 1323*a* may be moved in an outward direction F2, and the inner latch projection 1323*c* may be guided in the latch groove 1322*a*. When the buckle plate 1222 continues to move in the insertion direction F1, the latch stick 1323*a* may be inserted into the slit 1222*a* of the buckle plate 1222. Accordingly, the buckle plate 1222 may be coupled to the latch stick 1323*a* and a movement of the buckle plate 1220 may be limited, and the belt buckle 1220 may be fastened.

Figure 16:
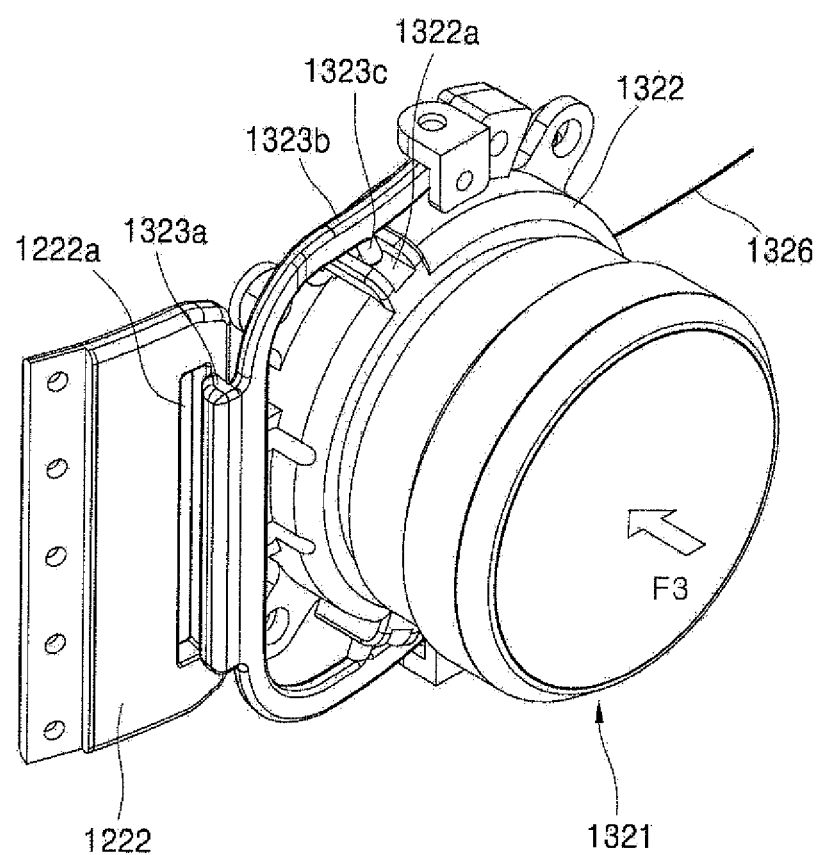
FIG. 16 is a perspective view schematically showing a second state of the leg belt shown in FIG. 9.
Figure 18:
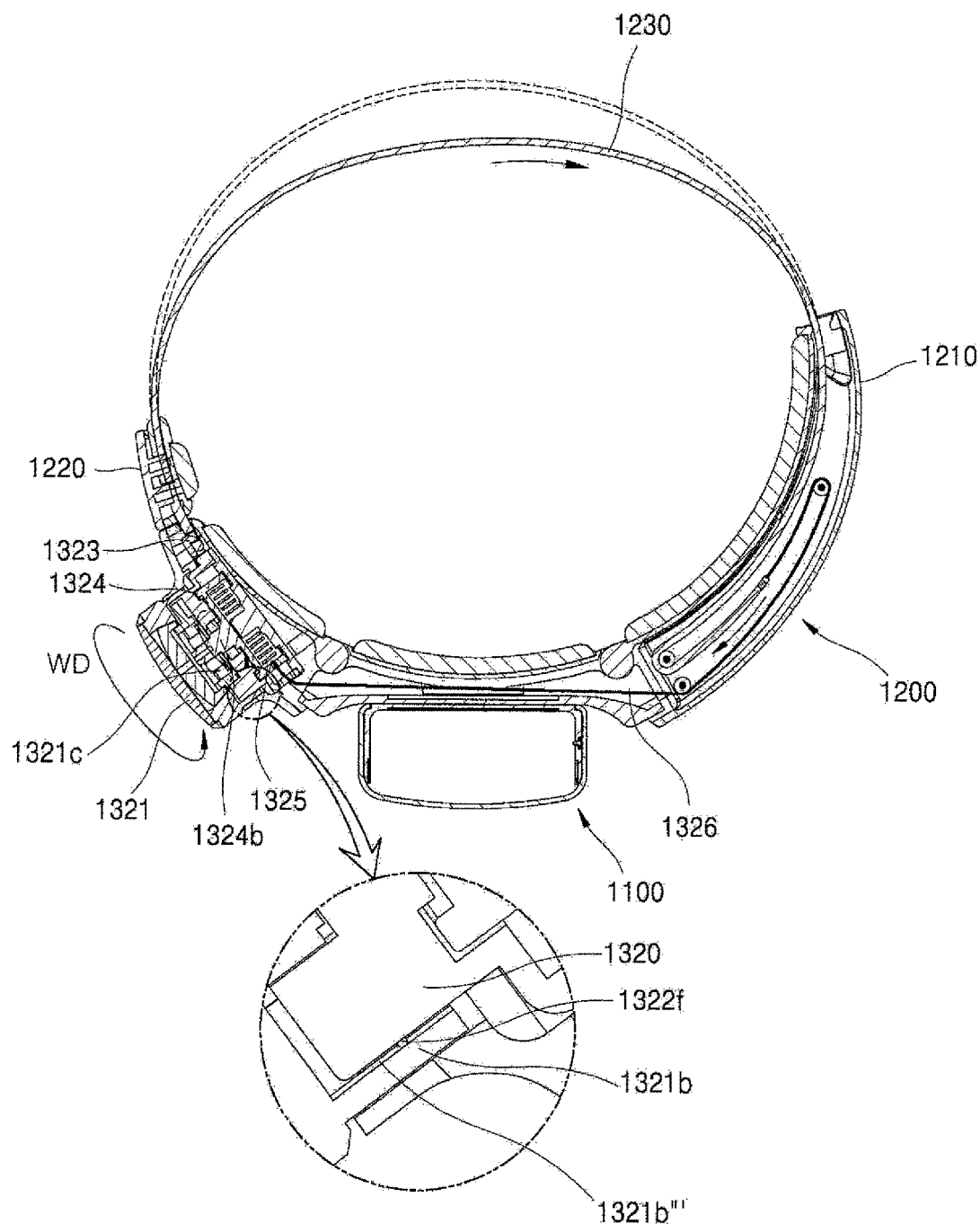
FIG. 18 is a schematic cross-sectional view of the leg belt of FIG. 9.

FIG. 16 is a perspective view schematically showing a second state of the leg belt shown in FIG. 9. FIG. 17 is a schematic side view of the leg belt shown in FIG. 16. FIG. 18 is a schematic cross-sectional view of the leg belt shown in FIG. 16.

A user may push the button dial 1321 in an inward direction F3 from a position R3 to a position R2. At R2, the projection 1324b of the wire reel 1324 may be inserted into the projection hole 1321c' of the inner disc 1321c of the button dial 1321, interlocking the wire reel 1324 with the button dial 1321 and thus restricting rotational movement of the wire reel 1324.

When a user rotates the button dial 1321 in a tightening direction WD (FIG. 16) to adjust the length of the belt 1230, the wire reel 1324 may be interlocked with a rotation of the button dial 1321, and the wire 1326 may be wound on the wire reel 1324 to tighten the belt 1250.

As the wire 1326 may be moved in a corresponding tightening direction UD (which may be opposite to an insertion direction F1 of the buckle 1220) (FIG. 15), the belt 1230 connected to the wire 1326 may be pulled into the first frame 1210. Accordingly, the length of the belt 1230 exposed to the outside may be adjusted to accommodate the leg of the user.

Further, the outer plate 1321b''' may be formed on the dial body 1321b, and the outer plate 1321b'' may be configured so that the button dial 1321 can be rotated only in one direction about the reel case 1322. The outer plate 1321b'' may be formed with a projection or stopper. When the outer plate 1321b''' is rotated with the button dial 1321 during a tightening of the belt 1230, the outer plate 1321b'' and thus the button dial 1321 may be prevented from rotating in a reverse direction by the projection or stopper of the outer plate 1321b'', despite an elastic force of the plate spring 1325 increasing. Thus, while the user may tighten the belt 1230 by rotating the button dial 1321, they may not be able to loosen the belt 1230 without unbuckling the buckle 1220. The reel case 1322 may be formed with an elastic projection 1322f corresponding to the stopper of the outer plate 1321b''. The elastic projection 1322f may be provided on the projection surface 1322e.

Further, a shape and size of a leg in a sitting state may be different from a shape and size in a standing state due to flexing and retracting of various leg muscles, e.g., quadriceps, hamstrings, gastrocnemius, and soleus (or more specifically, quadriceps femoris, biceps femoris, vastus lateralis, tibialis anterior, tibialis posterior, fibularis longus, etc.) The leg belt 1000 may allow adjustment of the length of the belt 1230 after fastening the belt buckle 1220. Accordingly, the user can sit down to don the Exoskeleton A, and the user can adjust the length of the belt 1230 to fit the leg in a seated state, and also a standing state when the user stands up.

FIG. 17 is a perspective view schematically showing a third use state of the leg belt shown in FIG. 9. FIG. 18 is a schematic side view of the leg belt shown in FIG. 17.

Figure 19:
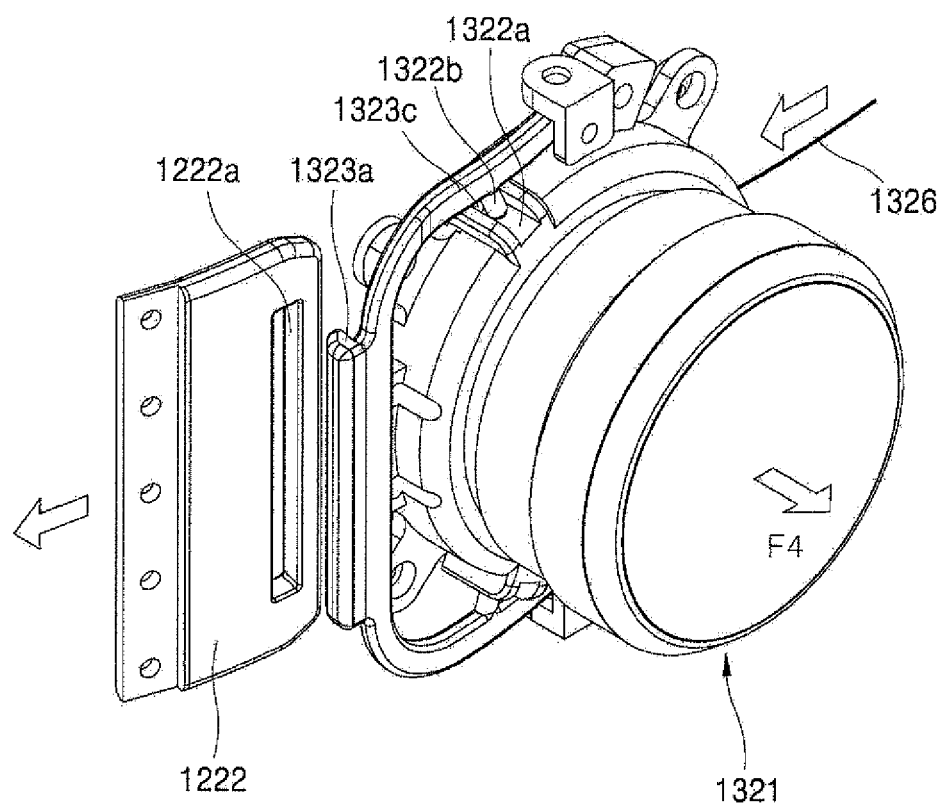
FIG. 19 is a perspective view schematically showing a third state of the leg belt shown in FIG. 9.

In order for the buckle plate 1222 to disengage from the latch stick 1323a to unfasten the buckle 1220, the user may pull the button dial 1321 to a position R4 in an outward direction F4 in FIGS. 18 and 19. When the outer plate 1321b'' is engaged with the projection surface 1322e of the reel case 1322, as the user continues to pull the button dial 1321 in the outward direction F4, the reel case 1322 may also be pulled in the outward direction F4, as it is interlocked with the button dial 1321. Accordingly, the inner latch projection 1323c of the latch hook 1323c may be moved together with the reel case 1322 in the outward direction F4 to come out of the latch groove 1322a and disengage with the latch flange 1322b, and the latch stick 1323a may be taken out of the slit 1222a of the buckle plate 1222.

The projection hole 1321c' of the inner disc 1321c of the button dial 1321 may be taken off of the projection 1324b of the wire reel 1324. Accordingly, the wire reel 1324 may not be interlocked with the button dial 1321, and the wire reel 1324 may rotate independently from a movement of the button dial 1321.

The wire reel 1324 thus may be rotated by a restoring force of the plate spring 1325. The wire 1326 may be wound on the wire reel 1324 by a rotation of the wire reel 1324. The belt 1230 may be pulled inside of the first support 1200 as the wire 1326 is wound around the wire reel 1324, and the belt 1230 may be moved to be stored inside the first frame 1210.

As the belt 1230 may be automatically rewound by a simple operation of the button dial 1321, the user can quickly and simply release the fixed state of the leg belt 1000. Further, when the leg belt 1000 is not used, the belt 1230 may be stored in the first frame 1210. Accordingly, contamination of and damage to the belt 1230 are prevented.

Figure 20:
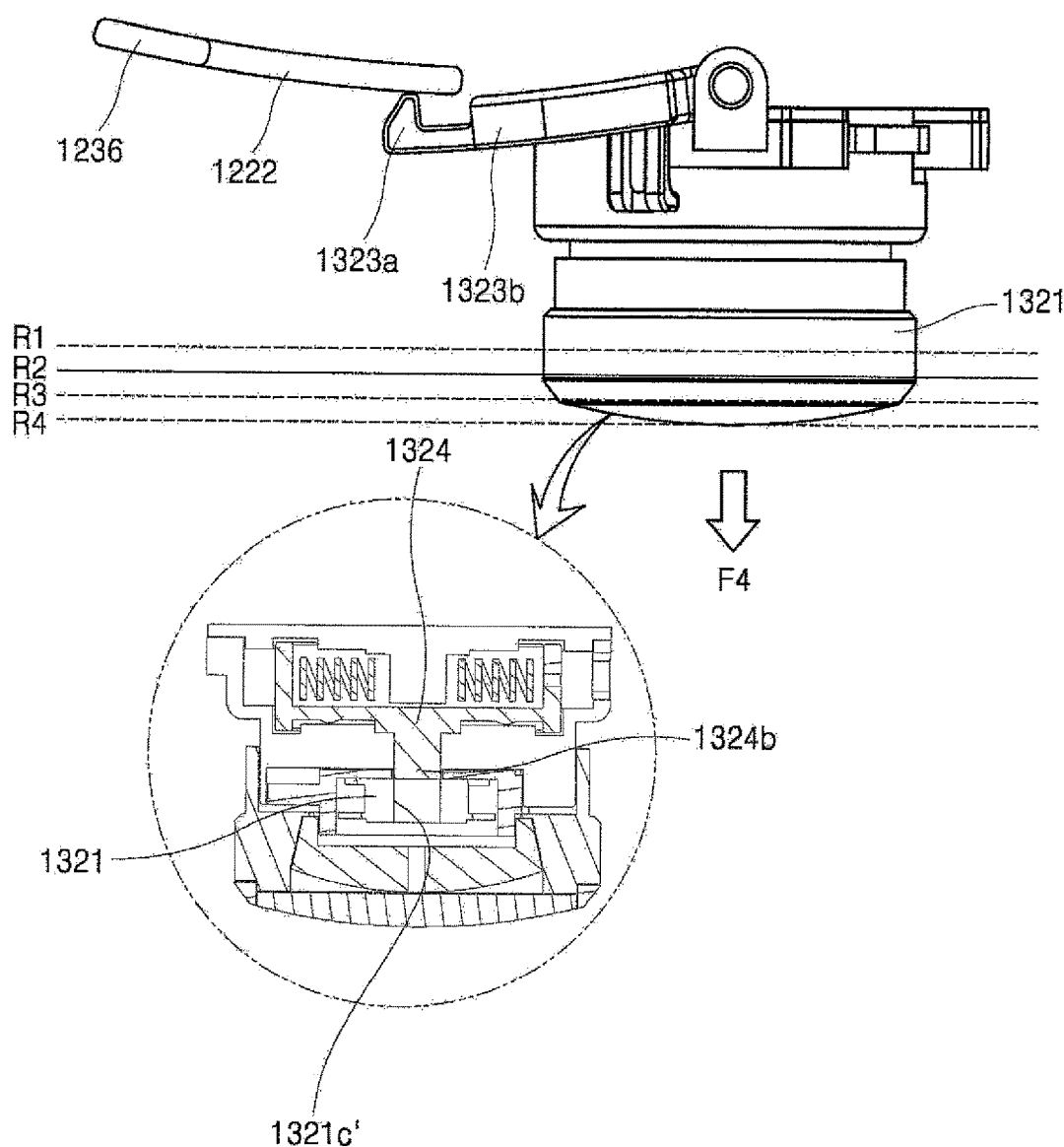
FIG. 20 is a schematic side view of the leg fixing portion shown in FIG. 19.

FIG. 19 is an exploded perspective view of the main frame, the first support and the second support in the leg belt shown in FIG. 9. FIG. 20 is a configuration view schematically showing a state in which an inner main frame, an inner first subframe, and an inner second subframe shown in FIG. 19 are coupled.

The main frame 1110 may include an inner main frame 1110a, an outer main frame 1110b, and an elastic member 1110c. The leg of the user may be supported in an inner side of the inner main frame 1110a, and the outer main frame 1110b may be coupled to an outside of the inner main frame 1110a. In consideration of a shape of the leg, the inner main frame 1110a may have a rectangular frame shape having a curved surface.

At a first end of the inner main frame 1110a, a first frame coupling structure portion or a first hinge hole or a first hinge bracket 1111a, which may be a first hinge portion, may be formed. At a second end of the inner main frame 1110a, a second hinge hole or a second hinge bracket 1112a, which may be a second hinge portion, may be formed. The first frame 1210 may be coupled to the first hinge bracket 1111a by a first hinge shaft or pin, and may form a first hinge joint with the first hinge bracket 1111a. The second frame 1310 may be coupled to the second hinge bracket 1112a by a second hinge shaft or pin, and may form a second hinge joint with the second hinge bracket 1112a.

The first hinge bracket 1111a may be formed on upper and lower surfaces of the first end of the inner main frame 1110a. The second hinge bracket 1112a may be formed in upper and lower surface of the second end of the inner main frame 1110a. As an embodiment of a hinge coupling structure, the first hinge bracket 1111a and the second hinge bracket 1112a may be formed with a groove. In the first frame 1210 and the second frame 1310, the first and second hinge knuckles or projections may be formed to correspond to the grooves of the first and second hinge brackets 1111a and 1112a, respectively. The first frame 1210 and the second frame 1310 may be coupled to the main frame 1110 by the first and second hinge joints by inserting the first and second hinge knuckles into the grooves of the first and second hinge brackets 1111a and 1112a. In this embodiment, the first and second hinge brackets 1111a and 1112a may be first and second hinge knuckles 1111a and 1112a, while the first and second hinge knuckles may be hinge shafts.

As an alternative embodiment of the hinge joints, a first hole may be formed in the first and second hinge brackets 1111a and 1112a. The first hole may be a through hole. A second hole corresponding to the first hole may be formed in the first frame 1210 and the second frame 1310, respectively. The first frame 1210 and the second frame 1310 can be coupled to the main frame 1110 by inserting a hinge shaft or pin into the first and second holes.

An elastic member 1110c may include a first elastic member 1111c and a second elastic member 1112c. The first elastic member 1111c may elastically support the first frame 1210. The second elastic member 1112c may support the second frame 1310 elastically.

The first elastic member 1111c and the second elastic member 1112c may have a cylindrical shape. A first pin or stopper 1111c' may be formed at a first end of the first elastic member 1111c, and a second pin or stopper 1111c" may be formed at a second end of the first elastic member 1111c. Further, a first pin or stopper 1112c' may be formed at a first end of the second elastic member 1112c, and a second pin or stopper 1112c" may be formed at a second end of the second elastic member 1112c. The first pins 1111e and 1112c' may also be referred to as bottom pins, and the second pins 1111c" and 1112c" may also be referred to as top pins.

A first insertion groove 1111a' may be formed in the first hinge bracket 1111a. The first elastic member 1111c may be housed in the first insertion groove 1111a'. When the first elastic member 1111c is inserted into the first insertion groove 1111a', the first pin 1111c' of the first elastic member 1111c may contact a side wall that forms the first insertion groove 1111a'.

Similarly, a second insertion groove 1112a' may be formed in the second hinge bracket 1112a. The second elastic member 1112c may be housed in the second insertion groove 1112a'. When the second elastic member 1112c is inserted into the second insertion groove 1112a', the first pin 1112c' of the second elastic member 1112c may be contact a side wall of the second insertion groove 1112a'.

The outer main frame 1110b may be formed to correspond to the inner main frame 1110a. The outer main frame 1110b may have a shape corresponding to that of the inner main frame 1110a so as to cover an outer side of the inner main frame 1110a. The outer main frame 1110b may be coupled to an outer side or exterior of the inner main frame 1110a.

The first frame 1210 may include an inner first frame 1210a and an outer first frame 1210b. The leg of the user may be provided inside of the inner first frame 1210a, and the outer first frame 1210b may be coupled to an outer side of the inner first frame 1210a. In consideration of a shape of the leg, the inner first frame 1210a may have a rectangular frame shape having a curved surface.

In a hinge coupling shown in the figures, a first main hinge knuckle 1211a corresponding to the first hinge bracket 1111a may be formed at a first end of the inner first frame 1210a.

Further, the first main hinge knuckle 1211a may be formed with a first coupling groove 1211a' to which the second pin 1111c" of the first elastic member 1111c may be coupled. The first elastic member 1111c may be inserted into the first insertion groove 1111a' of the first hinge knuckle 1111a, while the first pin 1111c' of the first elastic member 1111c may extend beyond the first insertion groove 1111a'. The second pin 1111c" of the first elastic member 1111c may be supported in the first coupling groove 1211a' of the first main hinge knuckle 1211a.

Accordingly, the first frame 1210 may be in an elastically supported state on the main frame 1110 by the first elastic member 1111c. When the first frame 1210 is coupled to the main frame 1110 by a hinge joint and rotated, the first pin 1111c' of the first elastic member 1111c may be supported at a side of the first insertion groove 1111a', and the second pin 1111c" may be supported on the first coupling groove 1211a'. The first elastic member 1111c may be compressed or expanded.

Further, a belt hole or opening 1212a in which the belt 1230 may be retracted and withdrawn may be formed in the inner first frame 1210a. The belt hole 1212a may be a slot. The outer first frame 1210b may be formed to correspond to the inner first frame 1210a. The outer first frame 1210b may have a shape corresponding to that of the inner first frame 1210a so that the outer first frame 1210b may cover an outer side of the inner first frame 1210a.

The second frame 1310 may include an inner second frame 1310a and an outer second frame 1310b. The leg of the user may be provided in an inside of the inner second frame 1310a, and the outer second frame 1310b may be coupled to an outside of the inner second frame 1310a. In consideration of a shape of the leg, the inner second frame 1310a may have a rectangular frame shape having a curved surface.

A second main hinge knuckle 1311a corresponding to the second hinge bracket 1112a may be formed at a first end of the inner second frame 1310a. The second main hinge knuckle 1311a may be formed with a second coupling groove 1311a' to which the second pin 1112c" of the second elastic member 1112c may be coupled. The second elastic member 1112c may be inserted into the second insertion groove 1112a' of the second hinge bracket 1112a, and the first pin 1112c' of the second elastic member 1112c may be supported on or at a side of the second insertion groove 1112a'. The second pin 1112c" of the second elastic member 1112c may be supported on the second coupling groove 1311a' of the second main hinge knuckle 1311a.

Accordingly, the second frame 1310 may be in an elastically supported state on the main frame 1110 by the second elastic member 1112c. When the second frame 1310 is coupled to the main frame 1110 by a hinge joint and rotated, the first pin 1112c' of the second elastic member 1112c may be supported at a side of the second insertion groove 1112a', and the second pin 1112c" may be supported on or in the second coupling groove 1311a'. The second elastic member 1112c may be compressed or expanded.

Further, a buckle hole or opening 1312a may be formed in the inner second frame 1310a. The buckle hole 1312a may be a slot and may also be referred to as an insertion hole. A buckle plate 1222 may be inserted into the buckle hole 1312a.

The outer second frame 1310b may be formed to correspond to the inner second frame 1310a. That is, the outer second frame 1310b may be formed in a shape corresponding to that of the inner second frame 1310a so that the outer second frame 1310b covers an outer side of the inner second frame 1310a. Further, a wire winder 1320 may be mounted on the outer second frame 1310b. Accordingly, the second frame 1310 may be coupled to the second side of the main frame 1110 by a hinge joint in a state in which the second frame 1310 may be elastically supported by the second elastic member 1112c.

As another embodiment of the elastic supporting structure, an elastic member may be formed in a plate shape. A first end of the elastic member may be coupled to the main frame 1110, and a second end of the elastic member may be coupled to a subframe or first and second frames 1200 and 1300. Accordingly, the first and second frames 1200 and 1300 can be elastically supported on the main frame by the elastic member.

Details of the elastic members, the hinge joints, and a storage of the belt 1230 may be found in U.S. application Ser. No. 16/274,662 filed on Feb. 13, 2019, Ser. No. 16/274,697 filed on Feb. 13, 2019, Ser. No. 16/282,409 filed on Feb. 22, 2019, and Ser. No. 16/352,920 filed on Mar. 14, 2019, the entire disclosures of which are incorporated by reference herein.

Figure 21:
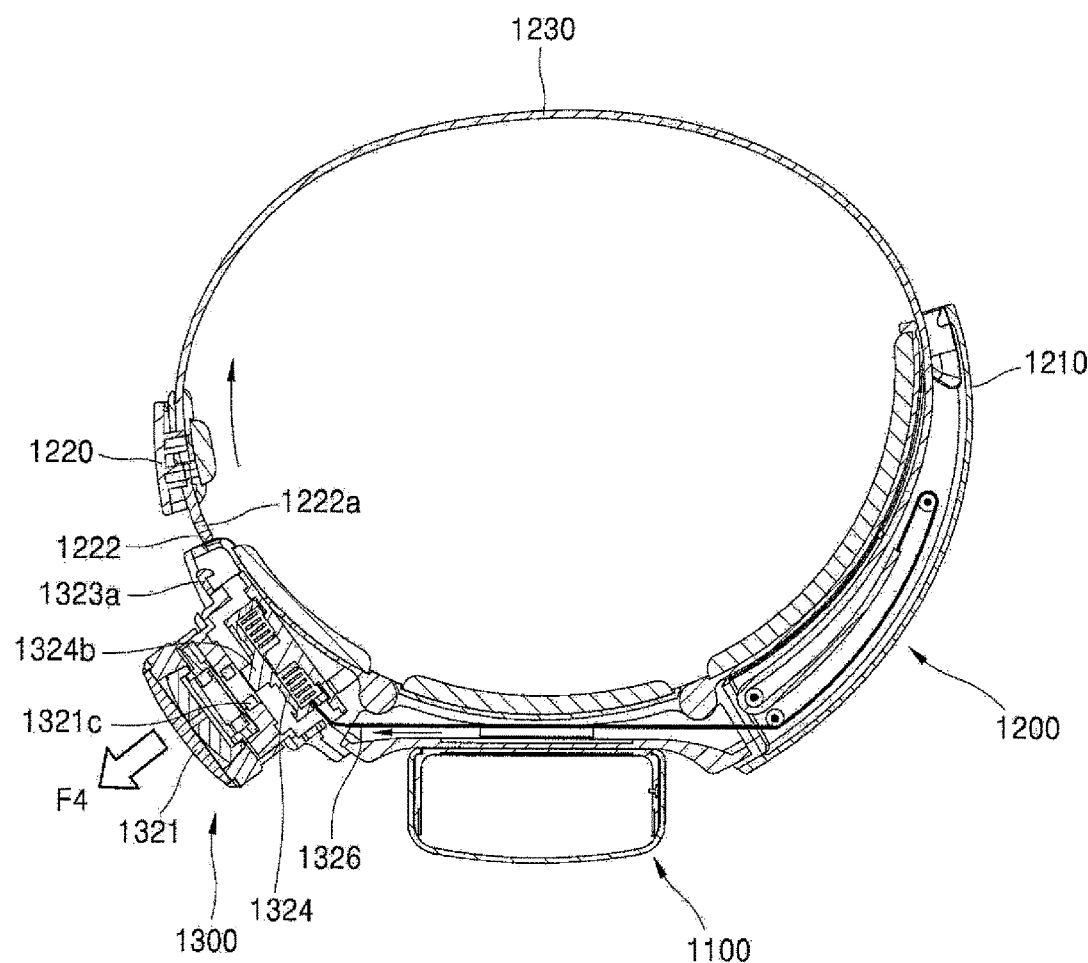
FIG. 21 is a schematic cross-sectional view of the leg belt shown in FIG. 19.

Referring to FIG. 21, a first stopper 1113a that limits a movement of the first frame 1210 may be formed on the first side of the outer main frame 1110b. On the second side of the outer main frame 1110b, a second stopper 1114a that limits a movement of the second frame 1310 may be formed. The first stopper 1113a may be provided in a rotation area or pivot area of the first frame 1210. The second stopper 1114a may be provided in a rotation area or pivot area of the second frame 1310.

A rotation area may mean an area or range in which the first frame 1210 and the second frame 1310 move, rotate, or pivot when the first and second frames 1210 and 1310 are coupled to the outer main frame 1110b, respectively. At an end of the first side of the outer main frame 1110b, the first stopper 1113a may be formed to be projected outward. The first stopper 1113a may oppose the first hinge portion 1111a.

An upper end of the first stopper 1113a may be higher than an upper end of the outer first frame 1210b that is coupled to the outer main frame 1110b. Accordingly, after the first frame 1210 is rotated by a predetermined angle about the main frame 1110, the first frame 1210 may be in contact with the first stopper 1113a and a rotation may be limited.

Further, at an end of the second side of the outer main frame 1110b, the second stopper 1114a may be formed to be projected outward. The second stopper 1114a may oppose the second hinge portion 1112a. An upper end of the second stopper 1114a may be higher than an upper end of the outer second frame 1310b that is coupled to the outer main frame 1110b. Accordingly, after the second frame 1310 is rotated by a predetermined angle about the main frame 1110, the second frame 1310 may contact the second stopper 1114a and a rotation may be limited.

FIG. 21 is a schematic view of the leg belt in FIG. 20.On both sides of the main support 1100, the first support 1200 and the second support 1300 may be coupled by a hinge joint so as to be rotatable. Further, the first support 1200 and the second support 1300 may be elastically supported by an elastic member. Accordingly, the first support 1200 and the second support 1300 may be rotated to an inside and an outside of an open area or reference area O of the leg belt 1000.

When the first support 1200 is rotated to the outside of the open area O by a predetermined angle or more, an outer first frame 1210b may be in contact with a first stopper 1113a and the rotation may be limited. When the second support 1300 is rotated to the outside of the open area O by a predetermined angle or more, an outer second frame 1310b may be in contact with a second stopper 1114a, and the rotation may be limited. A rotation angle of the first support 1200 and the second support 1300 may be set according to a position of the first stopper 1113a and the second stopper 1114a.

Figure 22:
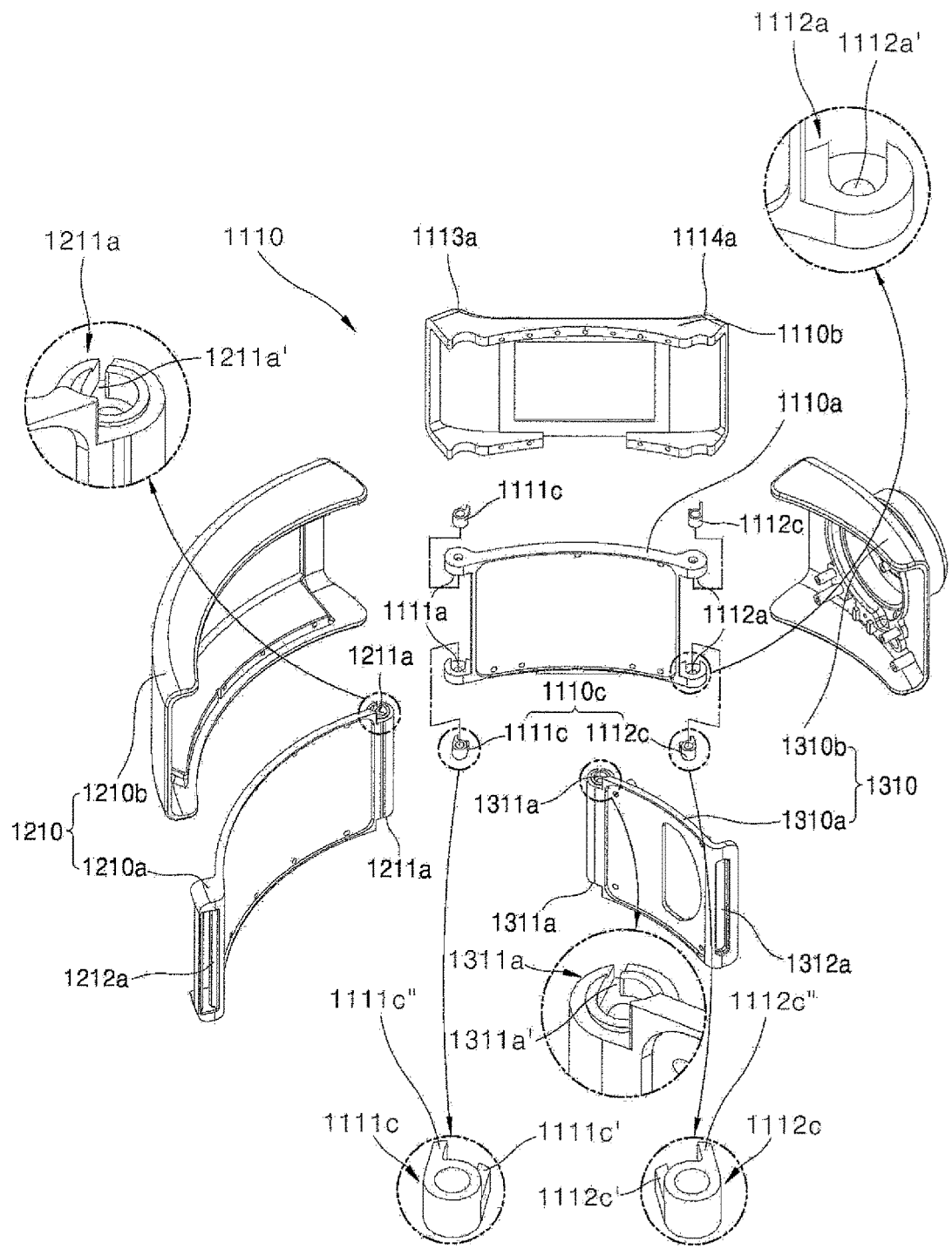
FIG. 22 is an exploded perspective view of a main frame, a first frame, and a second frame in the leg belt shown in FIG. 10.
Figure 23:
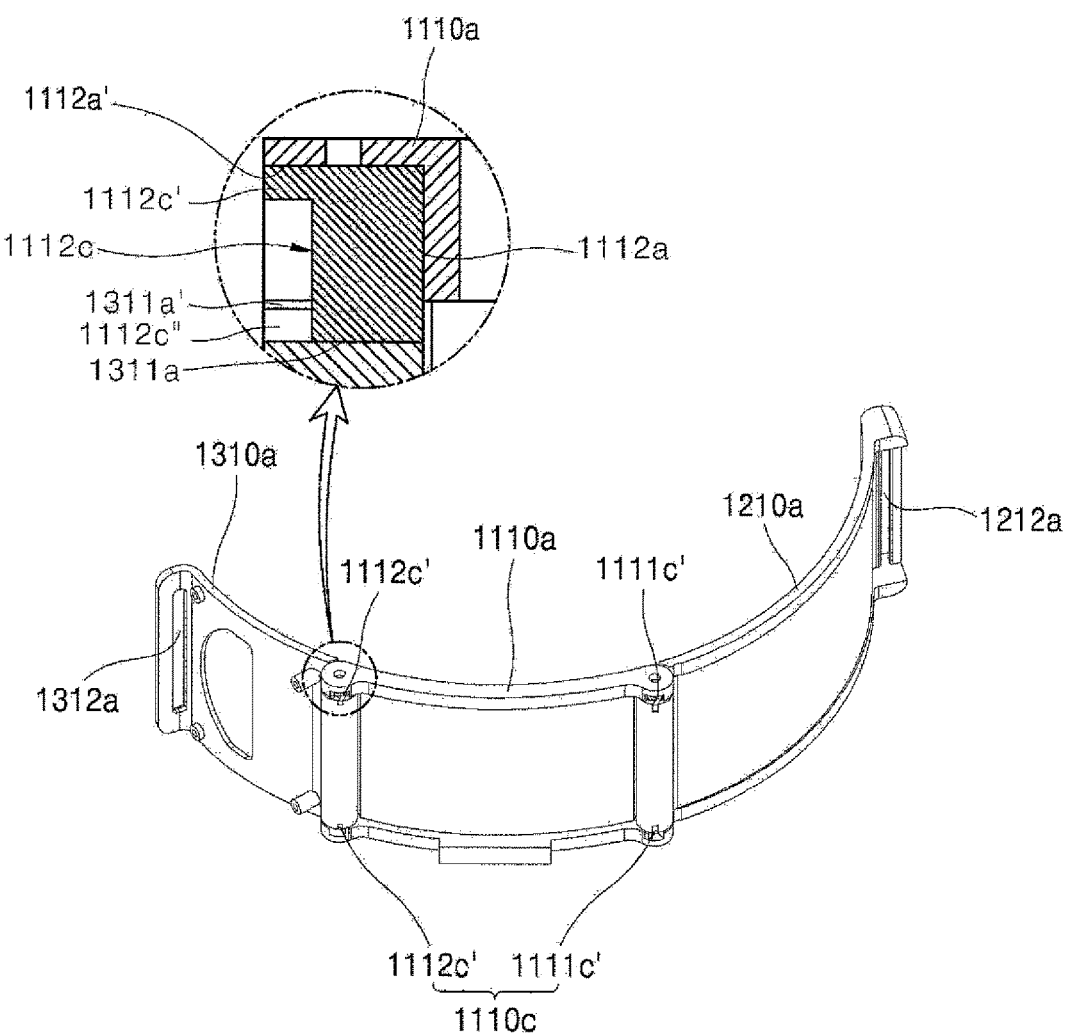
FIG. 23 is a configuration view schematically showing a state in which the inner main frame, the inner first frame, and the inner second frame shown in FIG. 19 are coupled.
Figure 24:
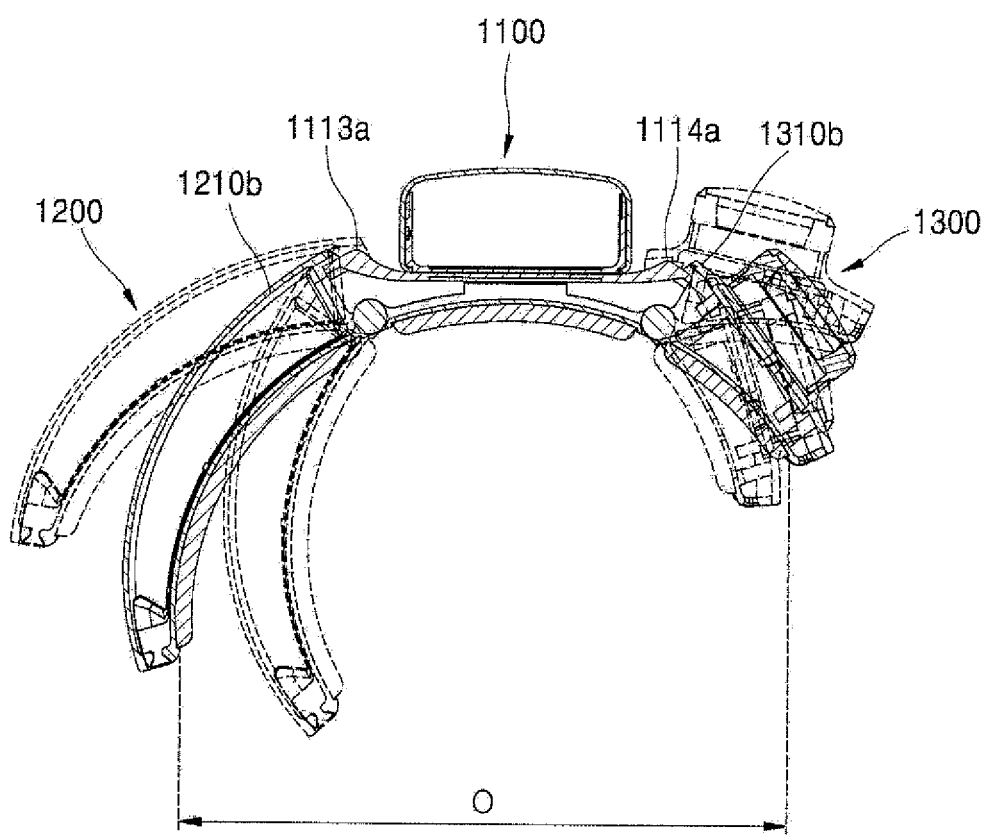
FIG. 24 is a schematic view of the leg belt shown in FIG. 19.
Figure 25:
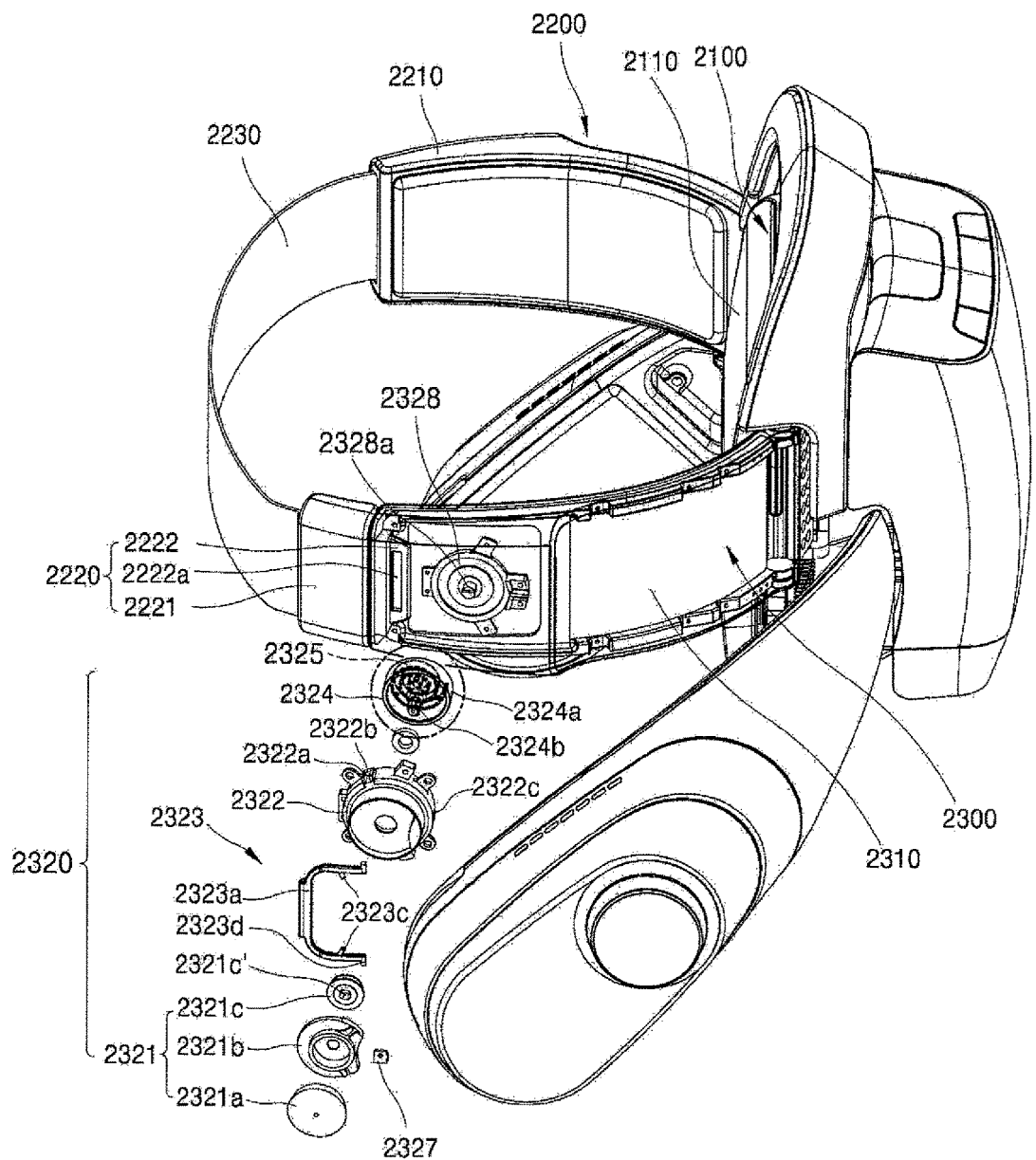
FIG. 25 is a perspective view schematically showing a waist belt in accordance with an embodiment in the wearable assistive device shown in FIG. 6A.

FIG. 22 is a perspective view schematically showing a waist belt in accordance with an embodiment in Wearable Exoskeleton A shown in FIG. 6A. The waist belt 2000 may have substantially the same or a similar structure as the leg belt 1000.

A waist belt 2000 may include a main waist support 2100, a first waist support 2200 and a second waist support 2300. The first waist support 2200 may be coupled to a first side of the main waist support 2100. The second waist support 2300 may be coupled to a second side of the main waist support 2100. The main waist support 2100 may be provided at a center of the waist belt 2000 and may form a center portion or center section, while the first waist support 2200 may be provided at the first, e.g., left, side and the second waist support 2300 may be provided at the second, e.g., right, side.

The first waist support 2200 may include a first subframe 2210, a belt buckle 2220, and a belt or strap 2230. The first subframe 2210 may be coupled to a main waist frame 2110 of the main waist support 2100 by a hinge joint. The belt buckle 2220 may include a buckle base or frame 2221 and a buckle plate or tongue 2222. A first side of the buckle base 2221 may be coupled to the belt 2230 and the buckle plate 2222 may be coupled to a second side of the buckle base 2221.

The buckle plate 2222 may be detachably coupled to the second waist support 2300. The buckle plate 2222 may be formed with a slit or latch ring 2222a into which a latch holder or latch hook 2323 is inserted.

A first end of the belt 2230 may be connected to the buckle base 2221 and a second end of the belt 2230 may be stored in the first subframe 2210 so as to be retractable and withdrawable. Accordingly, the buckle base 2221 may rest outside of the first subframe 2210 when the belt 2230 is completely stored in the first subframe 2210. Further, the belt 2230 may be made of a material having an elasticity.

The second waist support 2300 may include a second subframe 2310 and a wire winding structure or a wire winder 2320. The second subframe 2310 may be coupled to the main waist frame 2110 of the main waist support 2100 by a hinge joint. The wire winder 2320 may fix or release the belt buckle 2220. Further, the wire winder 2320 may operate a winding of a wire connected to the waist belt 2230.

When the first subframe 2210 and the second subframe 2310 are coupled to the main waist frame 2110, the belt 2000 may be formed in a substantially "C"-shape. Inner surfaces of the first subframe 2210 and the second subframe 2310 may be curved and symmetrical to each other.

Further, the wire winder 2320 may include a button dial 2321, a wire winding body or a reel case 2322, the latch hook 2323, a wire winding dispenser 2324 (e.g., bobbin, reel, or spindle), a plate spring 2325, a wire (not shown), a latch fixer 2327, and a base plate 2328. For convenience of description, the wire winding dispenser 2324 will be referred to as a wire reel 2324.

The button dial 2321 may be coupled to the reel case 2322 so as to be rotatable and wind a wire. The button dial 2321 may include a button 2321a, a dial body 2321b, and a wire operator or inner disc 2321c.

The button 2321a and the inner disc 2321c may be coupled to the dial body 2321b. A wire operation hole or projection hole 2321c' may be formed in the inner disc 2321c. The latch hook 2323 may secure the buckle plate 2222 and may be coupled to the wire case 2322.

The latch hook 2323 may include a latch stick 2323a, a latch body 2323b, an inner latch projection 2323c, and an outer latch projection 2323d. The latch stick 2323a may be inserted into the slit 2222a of the buckle plate 2222 to limit a movement of the buckle plate 2222. The latch stick 2323a may be projected outward at a vertical side of the latch body 2323b. The inner latch projection 2323c may be provided on the latch body 2323b so as to project to an inside of a C-shape of the latch body 2323b. The outer latch projection 2323d may be provided on the latch body 2323b so as to be projected outward from ends of the latch body 2323b.

The latch hook 2323, the button dial 2321, and the wire reel 2324 may be coupled to the reel case 2322. A latch groove 2322a, a latch support or latch flange 2322b, and a wire hole 2322c may be formed in the reel case 2322. The inner latch projection 2323c of the latch hook 2323 may be set on the latch groove 2322a. A movement of the inner latch projection 2323c may be limited in by the latch support 2322b to prevent the latch hook 2323 from sliding off of the reel case 2322. The outer latch projection 2323d may be coupled with the reel case 2322 by the latch fixer 2327.

The wire reel 2324 may be provided in the reel case 2322. A hole 2324a may be formed on an outer circumferential surface of the wire reel 2324, and a wire may be inserted into the hole 2324a to secure to or couple with the wire reel 2324. At a center of an outer side of the wire reel 2324, a projection 2324b may be formed. The projection 2324b may be selectively inserted into the projection hole 2321c' of the inner disc 2321c. When the inner disc is on the projection 2324b via the projection hole 2321c', a movement of the wire reel 2324 may be interlocked with a movement of the button dial 2321. When the inner disc 2321c is taken off the projection 2324b via the projection hole 2321c', the wire reel 2324 may be rotatable independent of the button dial 2321.

The plate spring 2325, which is an elastic member, may be inserted and coupled to an inner side of the wire reel 2324. The wire reel 2324 may be stacked on or secured to an outer side of the base plate 2328. Further, the base plate 2328 may be provided with an elastic projection 2328a. An end of the plate spring 2325 may be coupled with the elastic projection 2328a. A wire, not shown, may have the same technical configuration as the wire 1326 of the leg belt 1000 shown in FIG. 9.

More details of the waist belt can be found in U.S. application Ser. No. 16/274,662 filed on Feb. 13, 2019, and Ser. No. 16/274,697 filed on Feb. 13, 2019, the entire disclosures of which are hereby incorporated by reference herein. More details of the leg belt can be found in U.S. application Ser. No. 16/282,409 filed on Feb. 22, 2019, and Ser. No. 16/352,920 filed on Mar. 14, 2019, the entire disclosures of which are hereby incorporated by reference herein.

It is to be understood that the above-described embodiment is illustrative and not restrictive in all respects, and the scope of this disclosure will be indicated by the claims to be described later, rather than by the above-mentioned detailed description. It has to be construed that the meaning and the range of claims and all such modifications and changeable forms derived from the equivalent concept are included in the scope of this disclosure.

Embodiments disclosed herein may provide a wearable assistive device or a power assisting robot (e.g., wearable robot such as an exoskeleton) capable of storing a belt that secures a body of a user to the wearable assistive device. Embodiments disclosed herein may prevent a contamination and a breakage of the belt by using a structure where the belt is stored in the wearable assistive device when the user is not secured to the wearable assistive device. The wearable assistive device can be secured by connecting a wire to the belt and moving the belt through a winding of the wire.

Embodiments disclosed herein may be implemented as a wearable assistive device capable of easily operating a fastening and unfastening of the belt via a button dial. A belt fixing portion or belt buckle may be simply or quickly operated by unbuckling and buckling the belt to secure a body of a user by using a linearly moved button dial. The wearable assistive device may be capable of readjusting a length of the belt to fit the body in a state of securing or tightening the belt. That is, the wearable assistive device may be capable of readjusting the length of the belt so that the belt closely contacts the body once the belt is secured over the body.

The objects of this disclosure are not limited to the above-mentioned objects, and the other objects and the advantages of this disclosure, which are not mentioned, can be understood by the following description, and more clearly understood by the disclosed embodiments. It will be also readily seen that the objects and the advantages of this disclosure may be realized by means indicated in the patent claims and a combination thereof.

The wearable assistive device may include a frame that stores the belt so that the belt is retractable and withdrawable. A belt storage structure or storage portion may store the belt in a frame when the leg of the user is not secured, and withdraws the belt from the frame to secure the leg of the user. As a result, the belt may be withdrawn to an outside of the belt storage structure only when the body of the user is fixed. A contamination and a breakage of the belt may thus be prevented.

The wearable assistive device may include a wire connected to one end of the belt and a wire winding structure or wire winder that winds the wire. The wearable assistive device may wind and rewind the wire to move the belt.

The wearable assistive device may include a latch holder or latch hook to fasten a belt that covers the body (i.e., extends across the body) of the user, and a button dial to fix and release the belt by moving the latch hook. The belt may be fixed and released through a linear movement of the button dial so that the user can quickly and simply operate the belt. The wearable assistive device may include the latch hook to fix or secure the belt, a wire winding member or dispenser or a wire winder to wind a wire connected to the belt, and the button dial that is selectively coupled to the wire winder. A length of the belt may be adjusted by winding the wire when the belt is fastened (i.e., a slit of the belt buckle is secured to the latch hook), so that the user can readjust and/or tighten the belt.

When the belt is not fastened or buckled, it may be stored in a belt storage portion or frame to prevent contamination and damage. Accordingly, a lifetime of the belt may be extended, and the wearable assistive device may be maintained in a clean state. The belt may be connected to the wire, and the belt may be moved through the winding of the wire.

The user may simply operate the fastening and unfastening of the belt by using a linearly moved button dial. The user can withdraw the belt by linearly moving the button dial, and wrap it around his or her body before fastening the belt buckle. When the buckle is unfastened, the belt may be released in that it may be automatically moved or retracted into the belt storage portion by a winding force of the wire (or a restoring force of a spring in the wire winder), and the user can quickly and simply operate the securing and the releasing of the belt. Accordingly, the user can quickly wear and take off the wearable assistive device.

The wearable assistive device can readjust the length of the belt to fit the body in a buckled or fastened state of the belt. After fastening the belt, the user can adjust the degree of fastening to meet or accommodate a body size of the user and the purpose of use. Accordingly, the user can sit down and wear the belt, and can further adjust the degree of fastening of the belt to fit one's own body in a standing state.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A wearable assistive device, comprising:
   a main frame provided on a waist or pelvis;
   a leg assembly that extends from an end of the main frame, wherein the leg assembly includes a leg belt, wherein the leg belt includes:
   a belt to secure the leg, and
   a wire winder that includes a wire connected to a first end of the belt and a reel on which the wire is wound, wherein the wire winder fastens or unfastens a second end of the belt, and wherein the wire winder further includes:
   a latch hook,
   a reel case to which a first end of the latch hook is coupled, and,
   a button dial coupled to the reel case so as to be rotatable and linearly moveable.

2. The wearable assistive device of claim 1, wherein the leg belt further includes a buckle connected to the second end of the belt, and wherein the latch hook detachably couples to the buckle.

3. The wearable assistive device of claim 2, wherein the buckle includes a slit, and the latch hook includes a latch stick such that the latch stick is inserted into or taken out of the slit according to a movement of the latch hook.

4. The wearable assistive device of claim 3, wherein the wire winder further includes
   an elastic member compressed or restored according to a movement of the wire,
   wherein the reel on which the wire is wound is provided in the reel case and formed with a projection that is selectively connected to the button dial according to a movement of the button dial.

5. The wearable assistive device of claim 4, wherein the latch hook further comprises a latch body, an inner latch projection, and an outer latch projection, wherein the latch stick projects outward from a longitudinal side of the latch body, the inner latch projection projects inward of the latch body, and the outer latch projection projects outward from an end of the latch body.

6. The wearable assistive device of claim 5, wherein the reel case includes:
   a latch groove on which the outer latch projection is set,
   a latch support that projects at aside of the latch groove, and
   a wire hole, wherein the wire passes through the wire hole to connect to the reel.

7. The wearable exoskeleton of claim 6, wherein the button dial has a projection hole corresponding to the projection of the reel, and the button dial is linearly moved so that the projection hole is selectively coupled to the projection.

8. The wearable assistive device of claim 7, wherein the button dial is coupled to the reel case so as to be linearly movable to a first position, a second position, and a third position in the reel case, and the latch stick is inserted into the slit of the buckle when the button dial is at the first position, the projection is inserted into the projection hole when the button dial is moved to the second position, and the projection hole is taken off of the projection and the slit of the buckle is taken off of the latch stick when the button dial is moved to the third position.

9. The wearable assistive device of claim 1, wherein the leg belt comprises a main support and a subsupport that is coupled to the main support by a hinge joint, and the belt and the wire winder are coupled to the subsupport.

10. The wearable assistive device of claim 9, wherein the subsupport comprises a first support that is coupled to a first side of the main support by a hinge joint, and a second support that is coupled to the second side of the main support by a hinge joint, and wherein the first support comprises the belt, a storage frame, and a buckle that is coupled to the first end of the belt and detachably coupled to the wire winder, and wherein the wire and the wire winder are provided in the second support.

11. A wearable assistive device, comprising:
a main frame configured to support a waist or a pelvis;
a subframe coupled to the main frame; and
a leg assembly that extends from the main frame, wherein the subframe comprises a waist belt that secures a waist of a user, and the waist belt includes a belt, a wire connected to a first end of the waist belt, and a wire winder in which the wire is wound and which fixes or releases the belt, wherein the wire winder includes:
a latch hook,
a central body coupled to a first side of the latch hook, and
a button dial coupled to an outer side of the central body so as to be rotatable and linearly movable.

12. The wearable assistive device of claim 11, wherein a second end of the belt connects to a buckle, and the latch hook detachably hooks onto the buckle.

13. The wearable assistive device of claim 12, wherein the buckle includes a slit in which a latch stick of the latch hook is inserted into or withdrawn from according to a movement of the latch hook.

14. The wearable exoskeleton of claim 13, wherein the wire winder further includes
an elastic member that is compressed or restored according to a movement of the wire, wherein a reel is provided on an inner side of the central body, and the reel includes a protrusion that selectively connects to the button dial according to a movement of the button dial.

15. The wearable assistive device of claim 14, wherein the latch hook further comprises a latch body, an inner latch projection, and an outer latch projection, and wherein the latch stick is projected outward from the latch body, the inner latch projection is projected inward of the latch body, and the outer latch holder projection is projected outward from an end of the latch body.

16. The wearable assistive device of claim 15, wherein an outer circumference of the central body includes:
a latch groove on which the outer latch projection is set,
a latch flange that is projected from a side of the latch groove, and
a wire hole through which the wire passes.

17. The wearable assistive device of claim 16, wherein the protrusion is formed at a center of the reel, the button dial includes a projection hole corresponding to the protrusion, and the button dial is linearly moved so that the projection hole is configured to insert onto and slide off of the protrusion to selectively couple and decouple the button dial and the reel.

18. The wearable assistive device of claim 17, wherein the button dial is coupled to the central body so as to be linearly movable to a first position, a second position, and a third position, and wherein, when the button dial is at the first position, the latch stick is inserted into the slit of the buckle; when the button dial is at the second position, the protrusion is inserted into the protrusion hole; and when the button dial is at the third position, the protrusion hole and the protrusion are decoupled, and the slit is decoupled from the latch stick.

19. A belt of a wearable assistive device, comprising:
a strap that secures a body to the wearable assistive device; and
a wire housing connected to a first end of the strap, wherein the wire housing includes:
a wire configured to be wound on or unwound from the wire housing,
a latch stick that selectively couples to a latch ring of a buckle connected to a second end of the strap,
a case having an outer circumference on which a latch hook is coupled, the latch hook including the latch stick,
a button dial coupled to the case so as to be rotatable and linearly movable, and
an elastic member that is compressed when the strap is pulled and restored when the buckle is released, the wire being wound on a reel of the wire housing when the elastic member is restored, wherein the reel is provided in the case, and the reel includes a projection selectively connected to the button dial according to a linear movement of the button dial.

* * * * *